(12) United States Patent
Kondo et al.

(10) Patent No.: US 8,092,872 B2
(45) Date of Patent: Jan. 10, 2012

(54) OPTICAL FILM, ANTIREFLECTION FILM, AND POLARIZING PLATE AND DISPLAY DEVICE USING THE SAME

(75) Inventors: Shunichi Kondo, Minami-Ashigara (JP); Osamu Sawanobori, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 539 days.

(21) Appl. No.: 11/950,265

(22) Filed: Dec. 4, 2007

(65) Prior Publication Data
US 2008/0131674 A1    Jun. 5, 2008

(30) Foreign Application Priority Data

Dec. 5, 2006  (JP) ................. P2006-328634

(51) Int. Cl.
*C09K 19/52* (2006.01)
*B32B 27/40* (2006.01)

(52) U.S. Cl. .. 428/1.31; 428/423.1; 430/20; 252/299.01

(58) Field of Classification Search .............. 428/423.1, 428/1.31; 430/20; 252/299.01; 522/97
See application file for complete search history.

(56) References Cited

U.S. PATENT DOCUMENTS

| | | | |
|---|---|---|---|
| 7,241,480 B2 | 7/2007 | Hashimoto | |
| 7,420,005 B2 * | 9/2008 | Hojo et al. | 522/81 |
| 7,622,055 B2 * | 11/2009 | Nakano et al. | 252/299.01 |
| 2007/0231566 A1 * | 10/2007 | Yoneyama et al. | 428/331 |

FOREIGN PATENT DOCUMENTS

| | | |
|---|---|---|
| JP | 2003-335983 A | 11/2003 |
| JP | 2005-103979 A | 4/2005 |
| JP | 2005-181996 A | 7/2005 |
| JP | 2005-288787 A | 10/2005 |

* cited by examiner

*Primary Examiner* — Thao T. Tran
(74) *Attorney, Agent, or Firm* — Birch, Stewart, Kolasch & Birch, LLP

(57) ABSTRACT

An optical film includes a transparent support; and a hardcoat layer that is a layer formed by curing a coating solution containing (A) an octa- to pentadeca-functional urethane (meth)acrylate-based compound having a molecular weight of 800 to 2,000 and having two or more urethane bonds in its molecule, and a photopolymerization initiator.

8 Claims, No Drawings

OPTICAL FILM, ANTIREFLECTION FILM, AND POLARIZING PLATE AND DISPLAY DEVICE USING THE SAME

BACKGROUND OF THE INVENTION

1. Field of the Invention

The present invention relates to an optical film, an antireflection film, and a polarizing plate and a display device using the same.

2. Description of the Related Art

With recent increase in the screen size of a liquid crystal display device (LCD), a liquid crystal display device having disposed thereon an optical film such as antireflection film and light-diffusing sheet is increasing. For example, in various image display devices such as liquid crystal display device (LCD), plasma display panel (PDP), electroluminescent display (ELD) and cathode ray tube display device (CRT), the antireflection film is disposed on the display surface so as to prevent the reduction in contrast due to reflection of outside light or projection of an image. Also, the light-diffusing sheet is used on the backlight side of a liquid crystal display device.

The optical film is usually produced by stacking a light-diffusing (hardcoat) layer, a high refractive index layer, a low refractive index layer and the like on a transparent support.

The optical film is used on the outermost surface of a display and therefore, required to satisfy various film strengths, for example, scratch resistance against fine scratching and film hardness high enough to endure the pressure when written with a writing tool.

In order to meet these requirements, a method of stacking a hard layer on the surface or a method of incorporating an organosilane compound or increasing the thickness of the layer stacked has been performed.

On the other hand, the support of the surface film is required to be thinned for realizing a thin display surface.

When such a method of imparting film strength or thinning the support is performed, curling is increased and this brings about a problem that the surface film is hard to deal with in the production or processing, cracking (brittleness) is generated in the film during handling, or a separation phenomenon occurs after the lamination. In order to solve such a problem, there are created inventions using a modified acrylate-based compound (see, JP-A-2005-181996 (the terms "JP-A" as used herein means an "unexamined published Japanese patent application")), a urethane acrylate-based compound (see, JP-A-2005-288787) or a mixture of acrylate-based compounds differing in the property (see, JP-A-2005-103979 and JP-A-2003-335983).

In these inventions, the curling-improving effect and improvement of brittleness and the like may be obtained, but the film surface hardness is decreased. It is difficult to simultaneously satisfy the surface hardness as well as those properties, and technical development of a material having sufficiently high film strength for the optical film is demanded.

SUMMARY OF THE INVENTION

As a result of intensive studies on the composition for a photocured material enabling to reduce the curling and improve the brittleness while maintaining the surface hardness of film, the present inventors have found such a composition can be attained by using an octa- to pentadeca-functional urethane (meth)acrylate-based compound having a specific structure and at the same time, when this compound is combined with a constitutional factor for the antireflection effect, an optical film having a stable optical performance can be produced.

An aspect of the present invention is to stably provide an optical film assured of less curling despite strong film strength (surface hardness, flexibility) and capable of stably exhibiting the required optical performance. Another aspect of the present invention is to provide a polarizing plate and a display device each using the optical film.

The present invention provides an optical film, an antireflection film, a polarizing plate and an image display device, wherein at least one of the hardcoat layers is formed from a coating solution containing an octa- to pentadeca-functional urethane (meth)acrylate-based compound having a molecular weight of 800 to 2,000 and having two or more urethane bonds in the molecule, and a photopolymerization initiator. The above-described object can be attained by the present invention. More specifically, the present invention comprises the following constructions.

(1) An optical film comprising:

a transparent support; and a hardcoat layer that is a layer formed by curing a coating solution, the coating solution comprising (A) an octa- to pentadeca-functional urethane (meth)acrylate-based compound having a molecular weight of 800 to 2,000 and having two or more urethane bonds in its molecule; and a photopolymerization initiator.

(2) The optical film as described in (1), wherein the compound (A) is a compound synthesized by reacting an additive compound of an isocyanate compound and an active hydrogen-containing compound, with a compound having a (meth)acryloyl group and a hydroxyl group.

(3) The optical film as described in (2), wherein the active hydrogen-containing compound is a polyol.

(4) The optical film as described in (1), wherein the compound (A) is a compound represented by the following formula A:

Formula A:

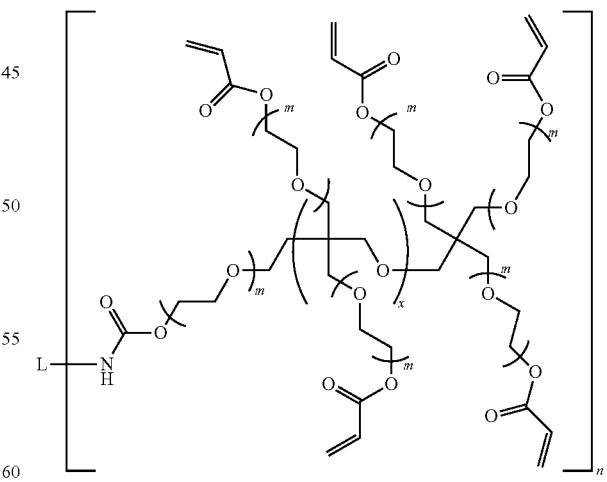

wherein

L represents a linking group having an n-valent bond, x represents 0, 1, 2, 3 or 4, n represents 2, 3, 4, 5 or 6, and m represents 0, 1, 2, 3, 4, 5, or 6.

(5) The optical film as described in (1), wherein
the hardcoat layer is a light-diffusing hardcoat layer comprising a light-transparent particle or a transparent hardcoat layer not comprising a light-transparent particle.

(6) The optical film as described in (1), wherein
the hardcoat layer comprises the compound (A); and a trifunctional or greater polyfunctional (meth)acrylate compound.

(7) An antireflection film comprising:
the optical film as described in (1); and
a layer, on the hardcoat layer of the optical film, having a refractive index lower than that of the hardcoat layer.

(8) A polarizing plate comprising:
a pair of protective films; and
a polarizing film sandwiched between the pair of protective films,
wherein
at least one of the protective films is the optical film as described in (1).

(9) A display device comprising:
the optical film as described in (1),
wherein
the hardcoat layer of the optical film is disposed on a viewing side.

DETAILED DESCRIPTION OF THE INVENTION

The optical film of the present, invention is an optical film comprising a transparent support having thereon at least one hardcoat layer, wherein at least one of the hardcoat layers is a layer formed by curing a coating solution containing an octa- to pentadeca-functional urethane (meth)acrylate-based compound having a molecular weight of 800 to 2,000 and having two or more urethane bonds in the molecule (hereinafter sometimes referred to as an "acrylate-based compound (A)"), and a photopolymerization initiator.

The hardcoat layer may or may not contain a light-transparent particle and may be a hardcoat layer having light-diffusing property (including antiglare property) or a hardcoat layer not having light-diffusing property. Also, the hardcoat layer may comprise a single layer or a plurality of layers, for example, from two to four layers, or may be a combination of a light-diffusing hardcoat layer and a transparent hardcoat layer not having light-diffusing property. In the hardcoat layer, the refractive index of the material in the portion other than the light-transparent particle is preferably from 1.45 to 2.00.

In the present invention, the hardcoat layer containing a light-transparent particle on the order of several μm capable of changing the light-scattering property or antiglare property is sometimes referred to as a light-diffusing hardcoat layer, and the hardcoat layer not containing such a light-transparent particle is sometimes referred to as a transparent hardcoat layer.

The transparent hardcoat layer and light-diffusing hardcoat layer are not particularly limited in the stacking arrangement and may be disposed in the order of a transparent hardcoat layer and a light-diffusing hardcoat layer from the support side or in the reverse order.

In the optical film of the present invention, a functional layer other than the hardcoat layer may be provided by coating, and examples of the other layer include an antistatic layer, a high refractive index layer, a low refractive index layer and an antifouling layer. The antistatic layer preferably contains an electrically conducting inorganic fine particle. The high refractive index layer preferably has a refractive index of 1.50 to 2.00. The refractive index of the low refractive index layer is preferably from 1.20 to 1.48, and the low refractive index layer is preferably provided on the outer side of and adjacently to the hardcoat layer or high refractive index layer and may be an outermost layer. The optical film may further have an antifouling layer on the low refractive index layer.

Furthermore, in view of reducing the reflectance, the low refractive index layer preferably satisfies the following mathematical formula (I):

$$(m\lambda/4) \times 0.7 < n_1 d_1 < (m\lambda/4) \times 1.3$$ Mathematical formula (I):

wherein m is a positive odd number, $n_1$ is the refractive index of the low refractive index layer, $d_1$ is the film thickness (nm) of the low refractive index layer, and λ is the wavelength and is a value in the range of 500 to 550 nm.

When mathematical formula (I) is satisfied, this means that m (a positive odd number; usually 1) satisfying mathematical formula (I) is present in the above-described wavelength range.

The optical film of the present invention preferably has internal scattering property. The internal scattering property is generally expressed by an internal haze, and the internal haze is usually a portion obtained by removing the surface haze portion from the entire haze measured. When the antireflection film having an internal scattering property of the present invention is incorporated on the outermost surface of a display device, optical unevenness attributable to other constituent elements of the display device (for example, brightness unevenness of the light source or chromaticity unevenness of the color filter) can be reduced. However, an excessively high internal haze incurs reduction of contrast. Therefore, the internal haze is preferably from 1 to 60%, more preferably from 1 to 50%, still more preferably from 1 to 40%.

The surface haze of the optical film of the present invention is preferably from 0 to 10% in the light of enhancing the dense black appearance, more preferably from 0.1 to 7%, still more preferably from 0.3 to 5%. The surface haze as used in the present invention is a value obtained by individually determining the entire haze and the internal haze and subtracting the internal haze from the entire haze by calculation.

The transmitted image sharpness of the optical film of the present invention is preferably from 30 to 80%, and in the light of achieving both the antiglare property and dense black appearance, more preferably from 30 to 70%. In the present invention, a coating composition is sometimes referred to as a coating solution, but these have the same meaning.

[Hardcoat Layer]

The hardcoat layer according to the present invention is a layer affecting the physical performance and optical performance, and the coating composition therefor contains monomers, oligomers or polymers for the matrix-forming binder, and an organic solvent. Depending on the case, the layer contains a light-transparent particle.

The coating solution for forming the hardcoat layer contains (A) an octa- to pentadeca-functional urethane (meth)acrylate-based compound having a molecular weight of 800 to 2,000 and having two or more urethane bonds in the molecule, as the main matrix-forming binder (main component of the binder), and a photopolymerization initiator and, if desired, further contains a light-transparent particle having the specific particle size ratio above, an additive for increasing the film hardness, an inorganic fine particle filler, for example, for decreasing the curling or adjusting the refractive index, a coating aid and the like. By virtue of using the specific binder of the present invention as the main component, the surface hardness, physical performance (e.g., brittleness), curling and the like of the hardcoat layer are improved.

The thickness of the hardcoat layer is, in the case of a light-diffusing hardcoat layer (sometimes referred to as a light-diffusing layer), preferably from 0.03 to 0.20 times, more preferably from 0.05 to 0.17 times, still more preferably from 0.07 to 0.15 times, the thickness of the transparent support. When the thickness is within this range, excellent film hardness is obtained, defects in terms of curling, haze value, glaring or the like are not caused, and the antiglare property can be easily balanced with the dense black appearance or the like. For example, the thickness of the light-diffusing layer is preferably from 2.4 to 16 μm when the support thickness is 80 μm, and preferably from 1.2 to 8 μm when the support thickness is 40 μm.

In the case of a transparent hardcoat layer, the thickness of the hardcoat layer is preferably from 0.02 to 0.40 times, more preferably from 0.04 to 0.30 times, the thickness of the transparent support.

[Binder]

The binder as used in the present invention indicates a film-constituting component excluding the light-transparent particle and includes, for example, the acrylate-based compound according to the present invention, a cured product of polymerizable compounds, and the polymer compound, organic silicon compound and surfactant which are described later.

The acrylate-based compound (A) (main component of the binder) can be obtained, for example, from a condensation product of an isocyanate compound and an active hydrogen-containing compound such as polyol. For example, the acrylate-based compound may be obtained by reacting a compound selected from, for example, methylene•bis(p-phenylenediisocyanate), hexamethylene diisocyanate•hexanetriol adduct, hexamethylene diisocyanate, tolylene diisocyanate, tolylene diisocyanate trimethylolpropane adduct, 1,5-naphthylene diisocyanate, thiopropyl diisocyanate, ethylbenzene-2,4-diisocyanate, 2,4-tolylene diisocyanate dimer, hydrogenated xylylene diisocyanate and tris(4-phenylisocyanate) thiophosphate, with a polyol described below, and further reacting the obtained reaction product with a compound having a (meth)acryloyl group and a reactive group such as hydroxyl group, carboxyl group, epoxy group or the like.

The acrylate-based compound (A) is preferably a compound represented by the following formula A.

Formula A:

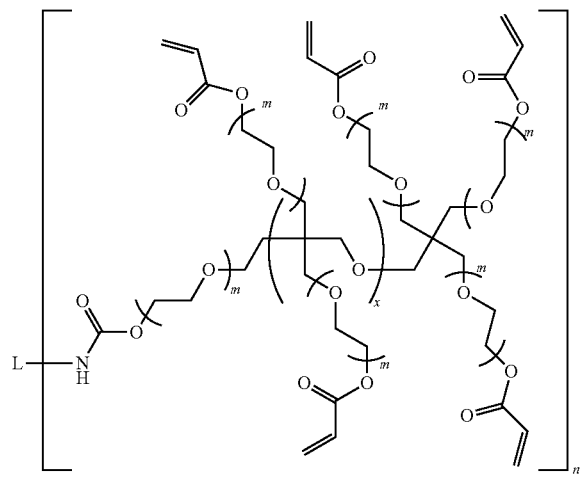

In formula A, L represents a linking group having an n-valent bond, n represents 2, 3, 4, 5 or 6, x represents 0, 1, 2, 3 or 4, and m represents 0, 1, 2, 3, 4, 5 or 6.

n is preferably 2, 3 or 4, and x is preferably 0, 1 or 2, more preferably 0 or 1.

The linking group having an n-valent bond is preferably an organic group having an n-valent bond. Specifically, the linking group is preferably an n-valent alkylene group having a carbon number of 1 to 8, an n-valent arene group having a carbon number of 6 to 10, an n-valent heterocyclic linking group having a carbon number of 3 to 14, or a linking group formed by combining an n-valent alkyl group having a carbon number of 1 to 8 and an n-valent arene group having a carbon number of 6 to 10.

The n-valent alkylene group having a carbon number of 1 to 8 (including a cycloalkylene group) includes an alkylene group (e.g., methylene, ethylene, trimethylene, tetramethylene, cyclopentylene, cyclohexylene, methylcyclohexylene), an alkanetriyl group (e.g., 1,2,3-propanetriyl, cyclopentanetriyl, cyclohexanetriyl), an alkanetetrayl group (e.g., butanetetrayl, pentanetetrayl, hexanetetrayl, cyclohexanetetrayl), an alkanepentayl group and an alkanehexayl group.

The n-valent arene group having a carbon number of 6 to 10 includes an arylene group (e.g., phenylene, naphthylene), an arenetriyl group (e.g., benzenetriyl, naphthalenetriyl), an arenetetrayl (e.g., benzenetetrayl, naphthalenetetrayl), an arenepentayl group and an arenehexayl group.

The n-valent heterocyclic linking group having a carbon number of 3 to 14 includes a divalent to tetravalent linking group including a s-triazine ring, a furan ring, a thiol ring, a carbazole ring or the like.

The linking group formed by combining an n-valent alkyl group having a carbon number of 1 to 8 and an n-valent arene group having a carbon number of 6 to 10 is not particularly limited, but structures shown below are preferred.

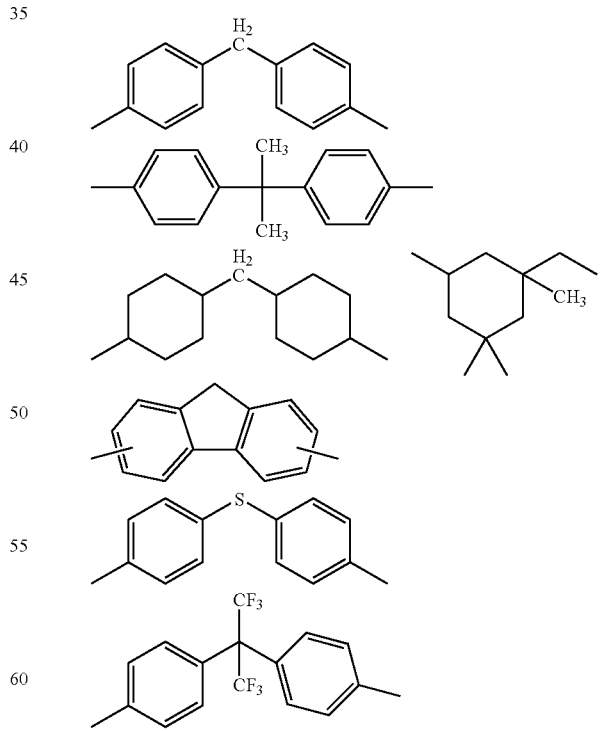

Specific examples of the acrylate-based compound (A) include commercially available products such as Hardcoat Urethane Acrylate HDT-4T, HMP-2, UN-904 and UN-901T produced by Negami Chemical Industrial Co., Ltd., and ARONIX M-1960 produced by Toagosei Co., Ltd., and urethane (meth)acrylate compounds represented by the following structural formulae M-1 to M-10, but the present invention is not limited thereto.
M-1
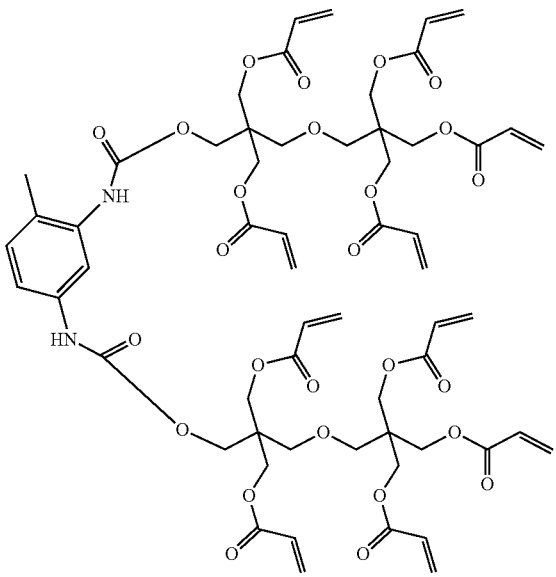
$C_{59}H_{70}N_2O_{26}$
Exact Mass: 1222.42
Mol. Wt.: 1223.18
C, 57.93; H, 5.77; N, 2.29; O, 34.01
M-2
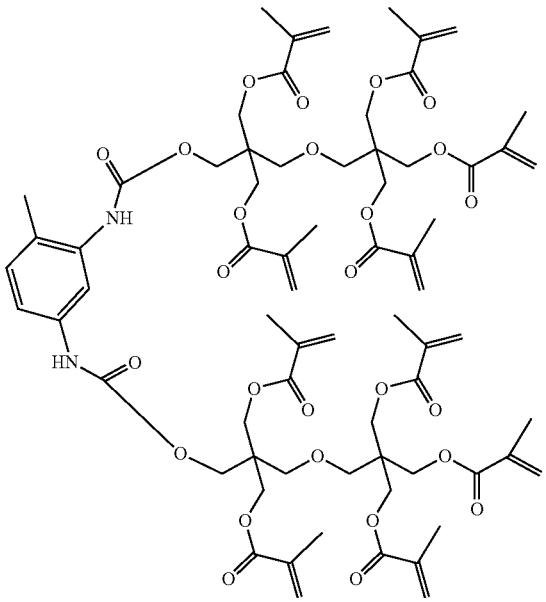
$C_{69}H_{90}N_2O_{26}$
Exact Mass: 1362.58
Mol. Wt.: 1363.45
C, 60.78; H, 6.65; N, 2.05; O, 30.51

M-3
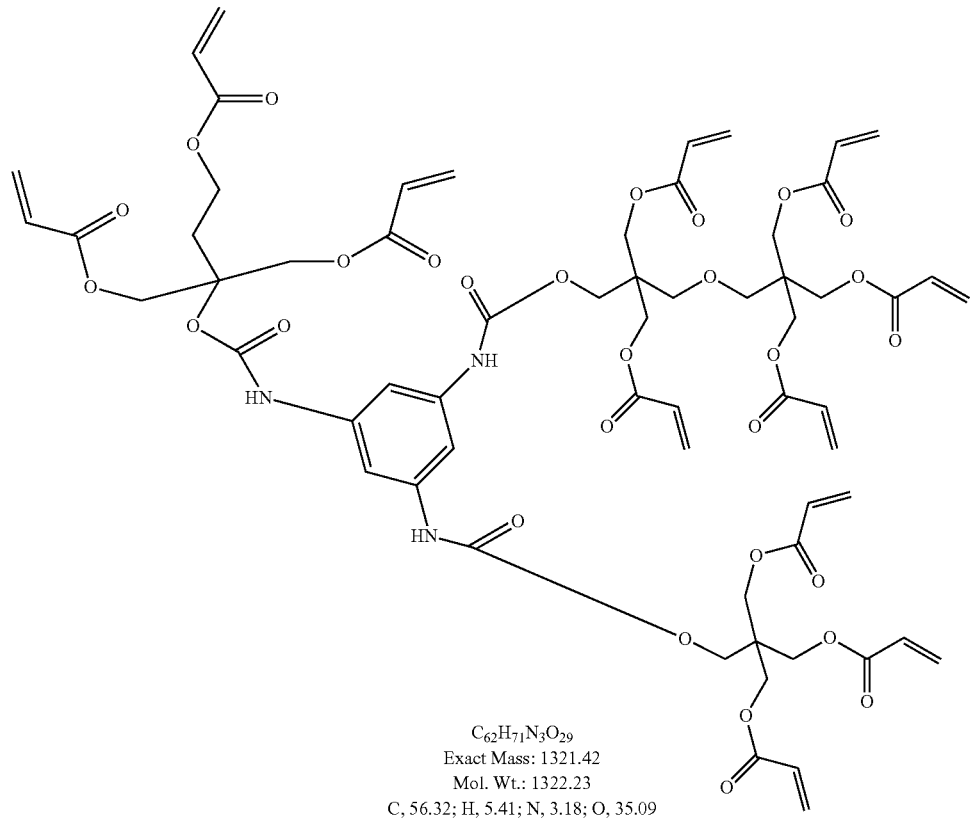
C_{62}H_{71}N_{3}O_{29}
Exact Mass: 1321.42
Mol. Wt.: 1322.23
C, 56.32; H, 5.41; N, 3.18; O, 35.09
M-4
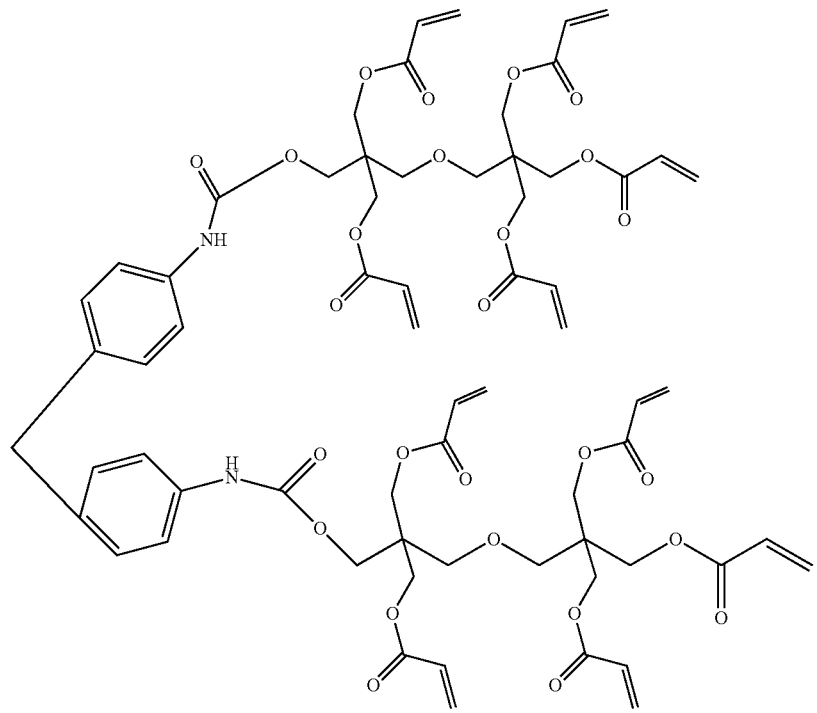
C_{65}H_{74}N_{2}O_{26}
Exact Mass: 1298.45
Mol. Wt.: 1299.28
C, 60.09; H, 5.74; N, 2.16; O, 32.02

-continued
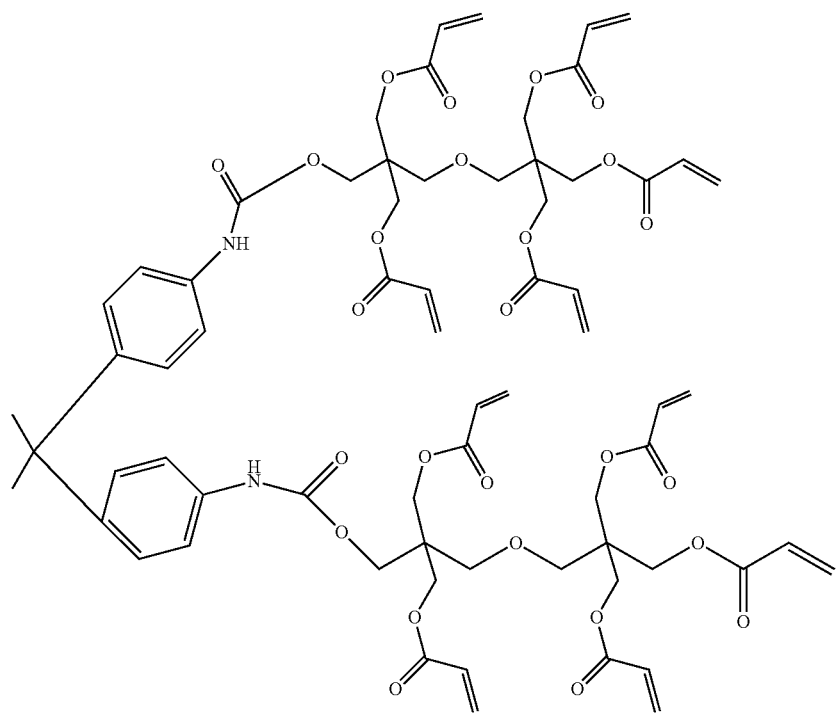
C₆₇H₇₈N₂O₂₆
Exact Mass: 1326.48
Mol. Wt.: 1327.33
C, 60.63; H, 5.92; N, 2.11; O, 31.34
M-5
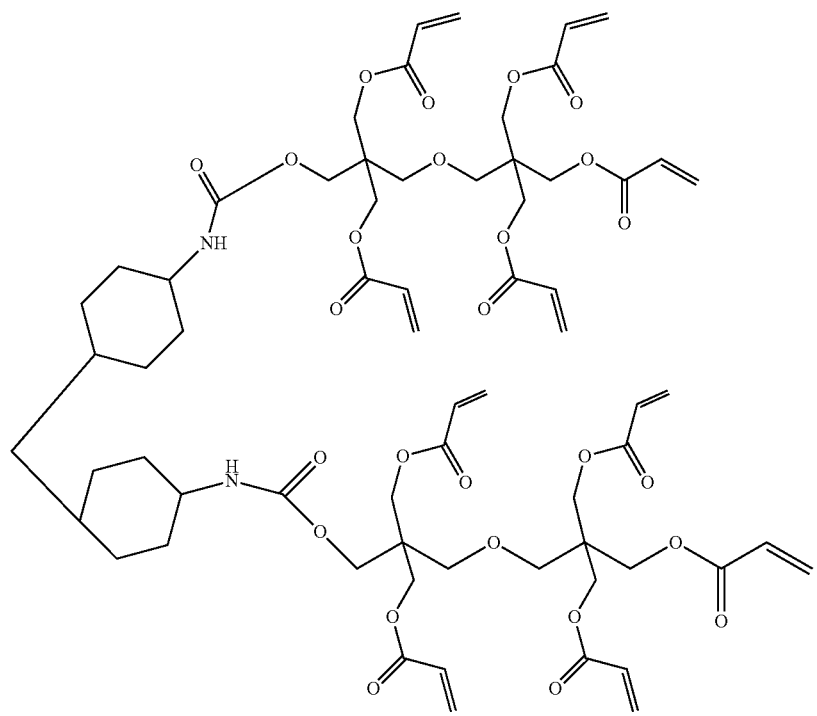
C₆₅H₈₆N₇O₂₆
Exact Mass: 1310.55
Mol. Wt.: 1311.38
C, 59.53; H, 6.61; N, 2.14; O, 31.72
M-6

M-7
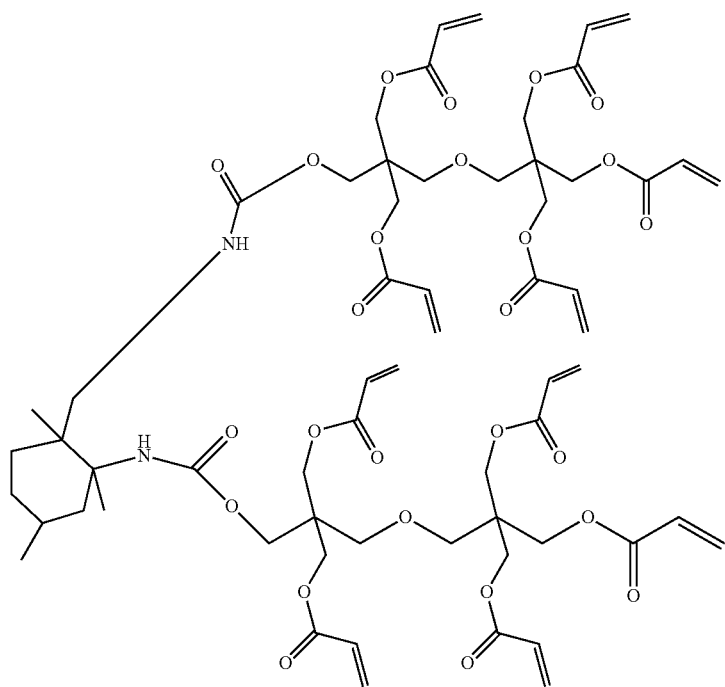
C₆₂H₈₂N₂O₂₆
Exact Mass: 1270.52
Mol. Wt.: 1271.31
C, 58.57; H, 6.50; N, 2.20; O, 32.72
M-8
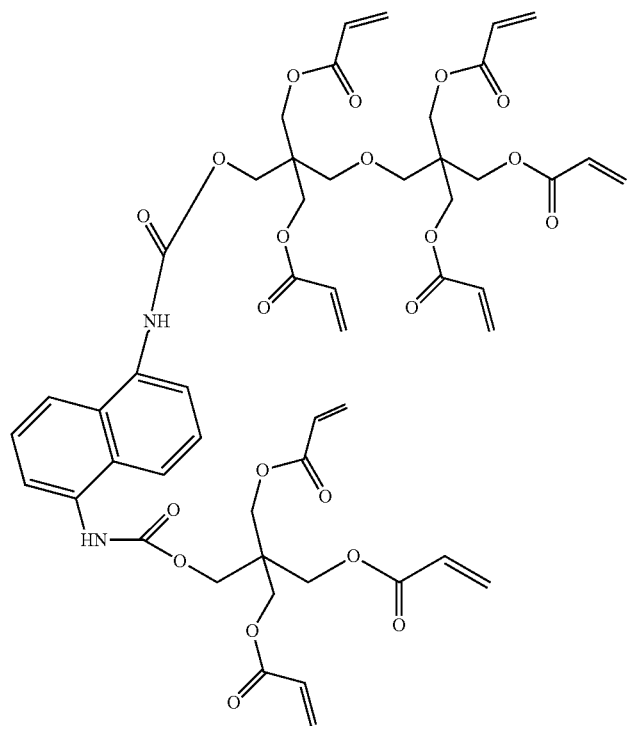
C₅₁H₅₆N₂O₂₁
Exact Mass: 1032.34
Mol. Wt.: 1032.99
C, 59.30; H, 5.46; N, 2.71; O, 32.53

-continued
M-9
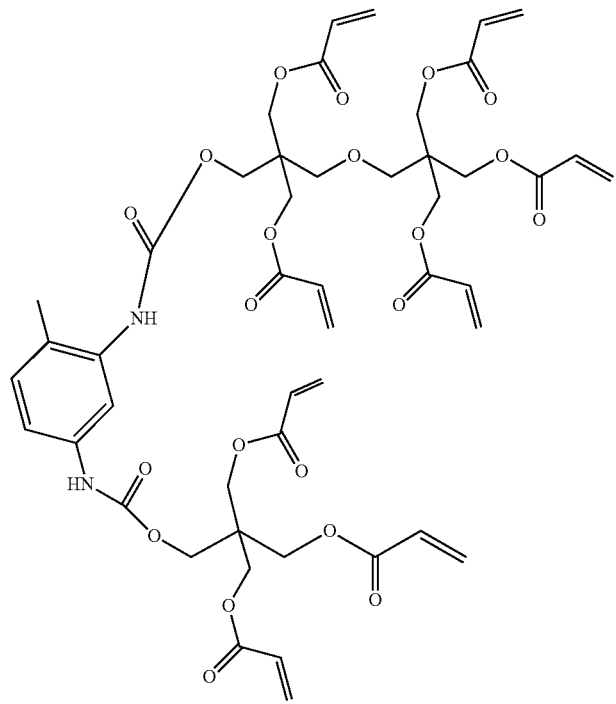
C₄₈H₅₆N₂O₂₁
Exact Mass: 996.34
Mol. Wt.: 996.96
C, 57.83; H, 5.66; N, 2.81; O, 33.70

M-10

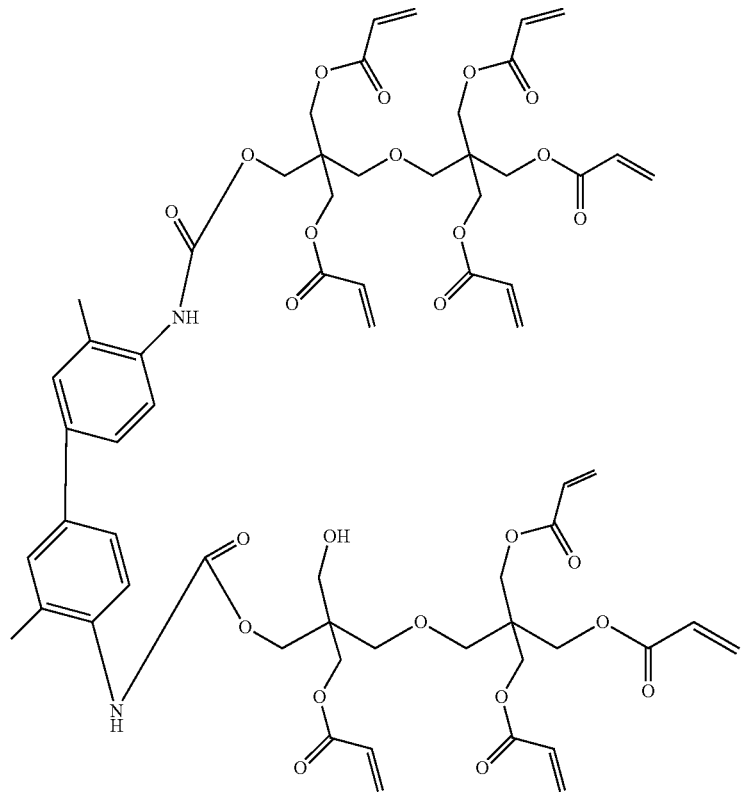

C$_{63}$H$_{74}$N$_2$O$_{25}$
Exact Mass: 1258.46
Mol. Wt.: 1259.26
C, 60.09; H, 5.92; N, 2.22; O, 31.760

The molecular weight of compounds M1 to M10 is as follows:

|      | C  | H  | N | O  | MW      |
|------|----|----|---|----|---------|
| M-1  | 59 | 70 | 2 | 26 | 1223.18 |
| M-2  | 69 | 90 | 2 | 26 | 1363.45 |
| M-3  | 62 | 71 | 3 | 29 | 1322.23 |
| M-4  | 65 | 74 | 2 | 26 | 1299.28 |
| M-5  | 67 | 78 | 2 | 26 | 1327.33 |
| M-6  | 65 | 86 | 2 | 26 | 1311.38 |
| M-7  | 62 | 82 | 2 | 26 | 1271.31 |
| M-8  | 51 | 56 | 2 | 21 | 1032.99 |
| M-9  | 48 | 56 | 2 | 21 | 996.96  |
| M-10 | 63 | 74 | 2 | 25 | 1259.26 |

If the molecular weight is less than 800, the amount of the unsaturated group reacted per unit volume increases and this gives rise to insufficient curling-inhibiting performance, whereas if the molecular weight exceeds 2,000, the solubility in a solvent decreases to cause a problem in the formation of a coating film. Also, if the compound is heptafunctional or less, the coating film cannot have sufficiently high surface hardness, whereas if the compound is hexadecafunctional or more, a trouble such as gelling readily occurs at the synthesis of the compound and this causes an industrial problem. Accordingly, as for the urethane (meth)acrylate compound used in the present invention, those having a molecular weight of 800 to 2,000 and being octa- to pentadeca-functional are effectively used.

When the polyfunctional urethane (meth)acrylate of the present invention is used, the film produced can have a high crosslinking density, and a tough film (high surface hardness, small brittleness) by virtue of hydrogen bonding or the like attributable to the urethane bond can be formed. Also, loss of the unsaturated bond per unit volume is small and this is considered to contribute to less curling.

In the present invention, other known acrylate compounds may be used by mixing such a compound together with the acrylate-based compound of the present invention. Above all, an acrylate-based compound having three or more (meth)acryloyl groups within one molecule, which forms a high-hardness cured product that is used in this art over a wide range, can be suitably used. Examples of this compound include esters of a polyhydric alcohol and a (meth)acrylic acid {for example, pentaerythritol tetra(meth)acrylate, pentaerythritol tri(meth)acrylate, tri-methylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth) acrylate, dipentaerythritol tetra(meth)acrylate, dipentaerythritol penta(meth)acrylate, dipentaerythritol hexa(meth) acrylate, pentaerythritol hexa(meth)acrylate, 1,2,3-cyclohexane tetramethacrylate, polyurethane polyacrylate, polyester polyacrylate, and caprolactone-modified tris(acryloxyethyl) isocyanurate}.

Specific examples of the polyfunctional acrylate-based compounds having three or more (meth)acryloyl groups include esterified products of a polyol and a (meth)acrylic acid, such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60 and KAYARAD GPO-303 produced by Nippon Kayaku Co., Ltd.; and V#400 and V#36095D produced by Osaka Organic Chemical Industry Ltd. Other examples of the polyfunctional acrylate-based compound which can be suitably used include trifunctional or greater functional urethane acrylate compounds such as Shiko UV-1400B, Shiko UV-1700B, Shiko UV-6300B, Shiko UV-7550B, Shiko UV-7600B, Shiko UV-7605B, Shiko UV-7610B, Shiko UV-7620EA, Shiko UV-7630B, Shiko UV-7640B, Shiko UV-6630B, Shiko UV-7000B, Shiko UV-7510B, Shiko UV-7461TE, Shiko UV-3000B, Shiko UV-3200B, Shiko UV-3210EA, Shiko UV-3310EA, Shiko UV-3310B, Shiko UV-3500BA, Shiko UV-3520TL, Shiko UV-3700B, Shiko UV-6100B, Shiko UV-6640B, Shiko UV-2000B, Shiko UV-2010B, Shiko UV-2250EA and Shiko UV-2750B (produced by The Nippon Synthetic Chemical Industry Co., Ltd.), UL-503LN (produced by Kyoeisha Chemical Co., Ltd.), UNIDIC 17-806, UNIDIC 17-813, UNIDIC V-4030 and UNIDIC V-4000BA (produced by Dainippon Ink and Chemicals, Inc.), EB-1290K, EB-220, EB-5129, EB-1830 and EB-4358 (produced by Daicel-UCB Company Ltd.), Hi-Coap AU-2010 and Hi-Coap AU-2020 (produced by Tokushiki Co., Ltd.), ARONIX M-1960 (produced by Toagosei Co., Ltd.), and Art Resin UN-3320HA, UN-3320HC, UN-3320HS, UN-904 and HDP-4T; and trifunctional or greater functional polyester compounds such as ARONIX M-8100, M-8030 and M-9050 (produced by Toagosei Co., Ltd.), and KBM-8307 (produced by DAICEL-CYTEC Company Ltd.).

Still other examples include a resin having three or more (meth)acryloyl groups, such as relatively low molecular weight polyester resin, polyether resin, acrylic resin, epoxy resin, urethane resin, alkyd resin, spiroacetal resin, polybutadiene resin and polythiolpolyene resin, and an oligomer or prepolymer of a polyfunctional compound (e.g., polyhydric alcohol).

The octa- to pentadeca-functional urethane (meth)acrylate-based compound having a molecular weight of 800 to 2,000 and having two or more urethane bonds in the molecule, for use in the present invention, is preferably contained in an amount of 40 to 99 mass %, more preferably from 50 to 98 mass %, still more preferably from 60 to 98 mass %, based on the entire binder amount.

In the case of using another monomer, for example, a trifunctional or greater polyfunctional (meth)acrylate compound, in combination, the content thereof is preferably from 10 to 70 mass %, more preferably from 20 to 50 mass %, based on the entire binder amount.

[Photopolymerization Initiator]

The photopolymerization initiator for use in the present invention is a compound which generates a radical capable of initiating a radical polymerization reaction, upon irradiation of ionizing radiation, and various known photopolymerization initiators described, for example, in Saishin UV Koka Gijutsu (Latest UV Curing Technology), page 159, Kazuhiro Takausu (publisher), Gijutsu Joho Kyokai (publishing company) (1991), the catalogue of Ciba specialty Chemicals, JP-A-2001-139663, JP-A-5-83588, JP-A-5-83588, JP-A-1-304453, U.S. Pat. No. 3,479,185, JP-A-5-239015, JP-A-8-134404, JP-A-11-217518, JP-A-2002-116539, and JP-A-2002-116539, may be used. Among these, a photo-initiator with high photo-initiating performance having photosensitivity at a wavelength of 300 to 430 nm is suitably used because the photosensitivity wavelength matches the light source such as high-pressure mercury lamp or metal halide lamp and high sensitivity is exhibited. In view of coloration of the film, a photo-initiator having photosensitivity at a wavelength of 300 to 380 nm is more preferred.

The photopolymerization initiator is preferably used in correspondence with the compounds which are polymerized, and is preferably used in an amount of, in terms of the total amount of polymerization initiators, from 0.1 to 15 parts by mass, more preferably from 1 to 10 parts by mass, per 100 parts by mass of the compound to be polymerized. Specific examples of the photopolymerization initiator are set forth below, but the present invention is not limited thereto.

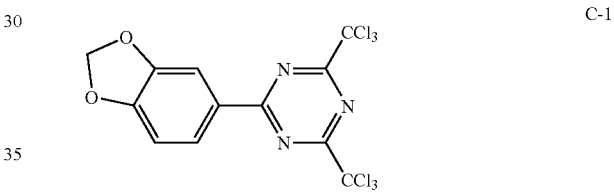

C-1

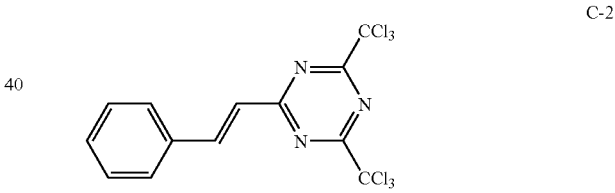

C-2

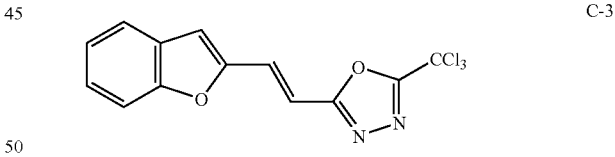

C-3

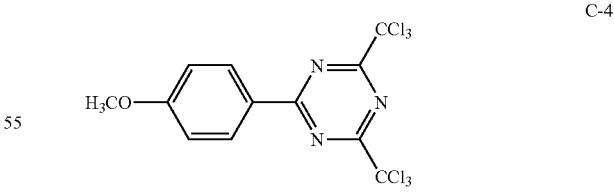

C-4

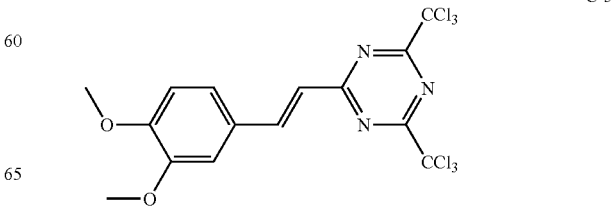

C-5

-continued
C-6
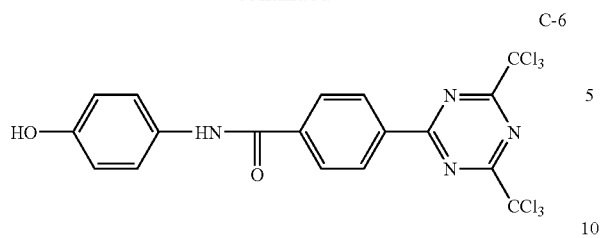
C-7
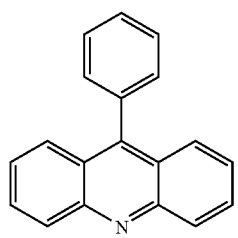
C-8
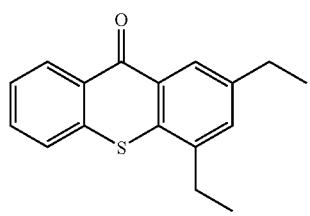
C-9
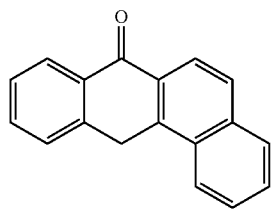
C-10
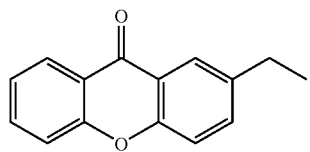
C-11
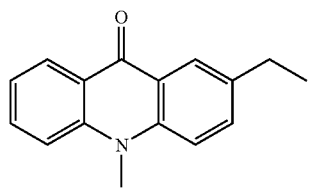
C-12
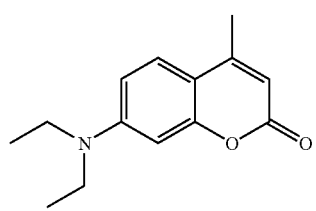
-continued
C-13
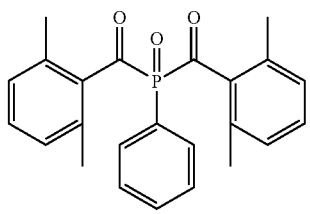
C-14
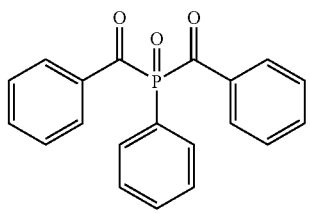
C-15
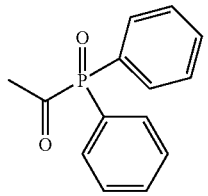
C-16
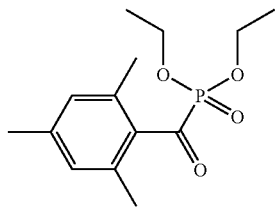
C-17
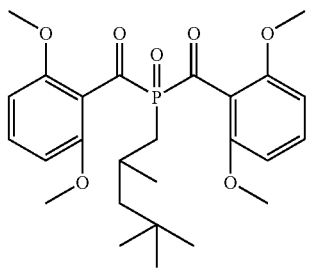
C-18
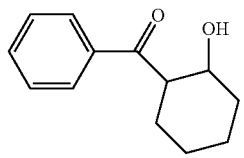
C-19
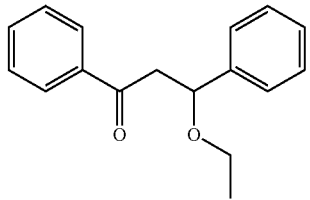

-continued
C-20
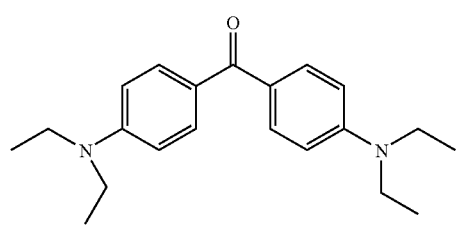
C-21
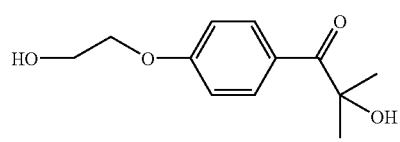
C-22
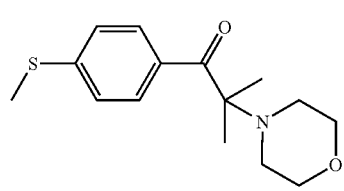
C-23
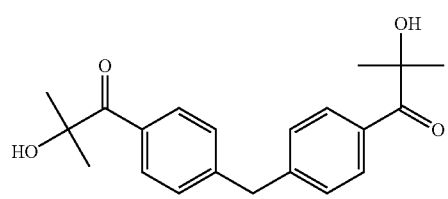
C-24
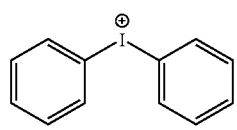
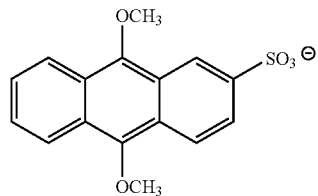
C-25
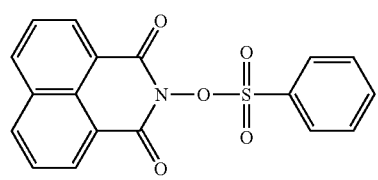
C-26
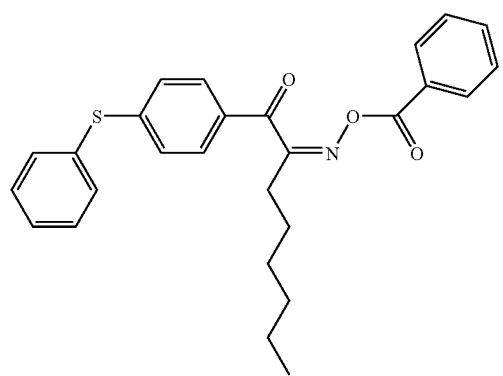
-continued
C-27
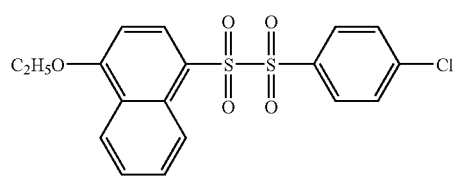
C-28
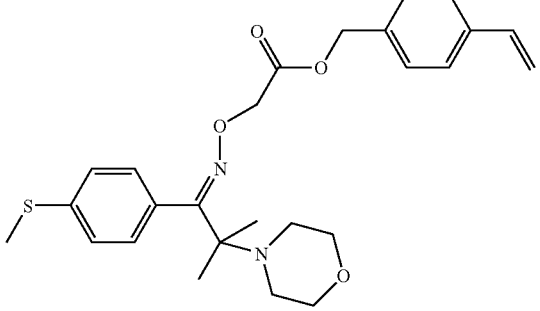
C-29
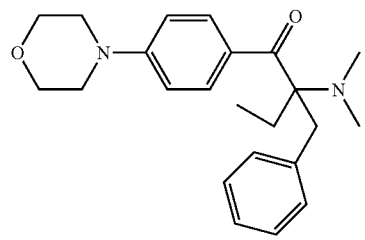
C-30
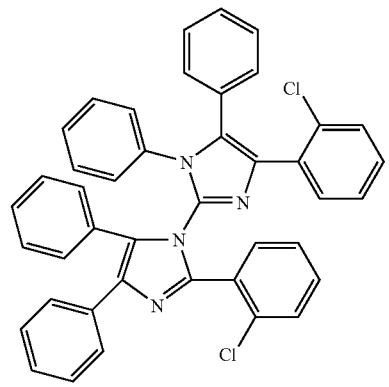
C-31
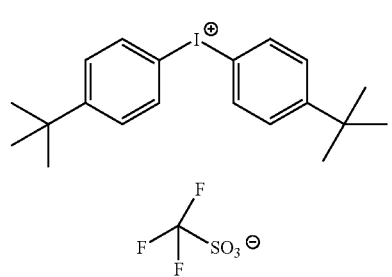

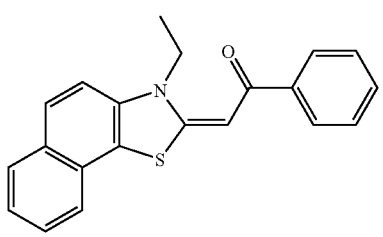

C-32

Among these compounds, trihalomethyl-s-triazine-based initiators C-1 to C-6, acylphosphone-based initiators C-13, C-14, C-16 and C-17, α-cleavage type initiators C-18, C-23, C-22 and C-29, and ketoxime-based initiators C-26 and C28 are preferred, because the sensitivity is high and coloration or the like is lessened.

(Polymer Compound)

The hardcoat layer according to the present invention may contain a polymer compound. The addition of a polymer compound is advantageous in that the cure shrinkage can be reduced, the coating solution viscosity affecting the dispersion stability (aggregating property) of the resin particle can be more successfully adjusted, the polarity of the solid matter in the drying process can be controlled to vary the aggregation behavior of the resin particle, or the drying unevenness in the drying process can be decreased.

The polymer compound has already formed a polymer when added to a coating solution. Examples of the polymer compound which is preferably used include a resin such as cellulose esters (e.g., cellulose triacetate, cellulose diacetate, cellulose propionate, cellulose acetate propionate, cellulose acetate butyrate, cellulose nitrate), urethanes, polyesters, (meth)acrylic esters (for example, a methyl methacrylate/methyl (meth)acrylate copolymer, a methyl methacrylate/ethyl (meth)acrylate copolymer, a methyl methacrylate/butyl (meth)acrylate copolymer, a methyl methacrylate/styrene copolymer, a methyl methacrylate/(meth)acrylic acid copolymer and a polymethyl methacrylate), and polystyrene.

In view of the effect on the cure shrinkage or the effect of increasing the coating solution viscosity, the polymer compound is preferably used in an amount of 10 to 60 mass %, more preferably from 20 to 50 mass %, based on all binders constituting the layer in which the polymer compound is contained.

The molecular weight of the polymer compound is, in terms of the mass average molecular weight, preferably from 3,000 to 400,000, more preferably from 5,000 to 300,000, still more preferably from 5,000 to 200,000.

The refractive index of the binder is, in terms of the refractive index of the entire matrix, preferably from 1.40 to 2.00, more preferably from 1.45 to 1.90, still more preferably from 1.48 to 1.85, yet still more preferably from 1.51 to 1.80. The refractive index of the binder is a value measured after removing the resin particle from the components of the hardcoat layer.

The binder for the hardcoat layer is preferably added in an amount of 20 to 95 mass % based on the solid content in the coating solution for the layer.

The hardcoat layer is preferably formed by applying the coating solution on a support, and performing light irradiation, electron beam irradiation, heat treatment or the like, thereby causing a crosslinking or polymerization reaction. In the case of ultraviolet irradiation, for example, an ultraviolet ray emitted from a light source such as ultrahigh-pressure mercury lamp, high-pressure mercury lamp, low-pressure mercury lamp, carbon arc, xenon arc or metal halide lamp may be utilized.

The curing with the ultraviolet ray is preferably performed after nitrogen purging or the like to an oxygen concentration of 4 vol % or less, more preferably 2 vol % or less, and most preferably 0.5 vol % or less. The temperature is preferably from 20 to 120° C., more preferably from 30 to 100° C., and the UV irradiation dose is preferably from 20 to 1,000 $mJ/cm^2$, more preferably from 30 to 600 $mJ/cm^2$.

In the hardcoat layer of the present invention, the compound (A) is appropriately mixed and used at the preferred content ratio above such that the percentage shrinkage after curing becomes less than 10%, and this is preferred for reducing the curling. The percentage shrinkage as used herein is represented by {(volume of binder before curing−volume of cured film after curing)/volume of binder before curing}× 100.

(Light-Transparent Particle)

The hardcoat layer for use in the present invention can be used as a light-diffusing hardcoat layer by containing a light-transparent particle.

The hardcoat layer for use in the present invention preferably contains a light-transparent particle having an average particle diameter of 0.2 to 0.8 times the thickness of the light-diffusing layer. The average particle diameter is more preferably from 0.3 to 0.8 times, still more preferably from 0.4 to 0.7 times, the thickness of the light-diffusing layer. When the average particle diameter is within this range, a screen assured of excellent dense black appearance and less roughened texture despite appropriate antiglare property can be obtained and on viewing a high-definition display, fine brightness unevenness called glaring ascribable to surface irregularities can be reduced.

In the light-transparent particle, other than the above-described average particle diameter, the difference in the refractive index from the binder described above is preferably adjusted so as to effectively bring out the light-diffusing effect. More specifically, the difference in the refractive index between the light-transparent particle and the binder is preferably 0.02 or more, more preferably from 0.03 to 0.25, still more preferably from 0.04 to 0.2.

Furthermore, the resin particle is preferably crosslinked by a crosslinking agent contained in an amount of 3 mol % or more based on all monomers before synthesizing the particle.

The amount of the light-transparent particle added to the binder is preferably from 2 to 40 mass %, more preferably from 4 to 25 mass %, based on the entire solid content of the hardcoat layer.

The coated added of the light-transparent particle is preferably from 10 to 10,000 $mg/m^2$, more preferably from 50 to 4,000 $mg/m^2$.

Specific preferred examples of the light-transparent particle for use in the present invention include a resin particle such as crosslinked polymethyl methacrylate particle, crosslinked methyl methacrylate-styrene copolymer particle, crosslinked polystyrene particle, crosslinked methyl methacrylate-methyl acrylate copolymer particle, crosslinked acrylate-styrene copolymer particle, melamine resin particle, benzoguanamine resin particle and polycarbonate particle. Furthermore, a so-called surface-modified particle obtained by chemically bonding a compound containing a fluorine atom, a silicon atom, a carboxyl group, a hydroxyl group, an amino group, a sulfonic acid group, a phosphoric acid group or the like, onto the surface of such a resin particle may also be preferably used. Among these, preferred are a crosslinked styrene particle, a crosslinked polymethyl methacrylate particle and a crosslinked methyl methacrylate-styrene copolymer particle.

The shape of the resin particle may be either truly spherical or amorphous. As for the particle size distribution, in view of the control of haze value and diffusion and the homogeneity of coated surface state, a monodisperse particle is preferred. For example, when a particle having a particle diameter 20% or more larger than the average particle diameter is defined as a coarse particle, the percentage of this coarse particle in the number of all particles is preferably 1% or less, more preferably 0.1% or less, still more preferably 0.01% or less. The particle having such a particle diameter distribution is obtained by performing classification after a normal synthesis reaction, and when the number of classifications is increased or the level of classification is elevated, a particle having a more preferred distribution can be obtained.

Specific examples of the light-transparent inorganic particle include a silica particle, a hollow silica particle, an alumina particle, and a metal oxide particle such as $TiO_2$ particle, $MgO_2$ particle, $SrO_2$ particle, $BaO_2$ particle, $SrSO_4$ particle, $SnO_2$ particle and $ZnO_2$ particle. It is also preferred that the particle is a secondary particle or an amorphous secondary particle.

The particle size distribution of the particle is measured by a Coulter counter method, and the measured distribution is converted into a particle number distribution. The average particle diameter is calculated from the obtained particle distribution.

(Inorganic Filler)

In the hardcoat layer for use in the present invention, for the purpose of adjusting the refractive index or film strength, an inorganic filler may be used to increase the layer hardness, decrease the cure shrinkage and further elevate the refractive index, in addition to the light-transparent particle.

The content of the inorganic filler is 10 mass % or more, preferably from 15 to 80 mass %, more preferably from 20 to 70 mass %, based on the entire solid content of the hardcoat layer.

As for the inorganic filler, it is also preferred to contain a fine inorganic filler comprising an oxide of at least one metal selected from titanium, zirconium, aluminum, indium, zinc, tin and antimony and having an average primary particle diameter of generally 0.2 μm or less, preferably 0.1 μm or less, more preferably 0.06 μm or less.

On the contrary, in the light-diffusing layer using a resin particle having a high refractive index, it is also preferred to decrease the refractive index of the binder so as to increase the difference in the refractive index from the particle. Examples of the inorganic filler usable for this purpose include a silica fine particle and a hollow silica particle. The preferred particle diameter is the same as that of the above-described fine inorganic filler added for elevating the refractive index.

Specific examples of the fine inorganic filler include $TiO_2$, $ZrO_2$, $Al_2O_3$, $In_2O_3$, $ZnO$, $SnO_2$, $Sb_2O_3$, ITO (Sn-doped indium oxide) and $SiO_2$. Among these, $TiO_2$ and $ZrO_2$ are preferred from the standpoint of elevating the refractive index. It is also preferred to subject the surface of the inorganic filler to a silane coupling treatment or a titanium coupling treatment. A surface treating agent having a functional group capable of reacting with the binder species on the filler surface is preferably used.

Incidentally, the fine inorganic filler has a particle diameter sufficiently smaller than the wavelength of light and therefore, causes no scattering, and the dispersion obtained by dispersing the filler in the binder polymer has a property as an optically uniform substance.

(Organic Solvent)

The coating composition for forming the hardcoat layer preferably contains at least one organic solvent.

Examples of the organic solvent include, as the alcohol type, methanol, ethanol, n-propanol, isopropanol, n-butanol, isobutanol, secondary butanol, tertiary butanol, isoamyl alcohol, 1-pentanol, n-hexanol, methyl amyl alcohol; as the ketone type, methyl isobutyl ketone, methyl ethyl ketone, diethyl ketone, acetone, cyclohexanone and diacetone alcohol; as the ester type, methyl acetate, ethyl acetate, n-propyl acetate, isopropyl acetate, isobutyl acetate, n-butyl acetate, isoamyl acetate, n-amyl acetate, methyl propionate, ethyl propionate, methyl butyrate, ethyl butyrate, methyl acetate, methyl lactate and ethyl lactate; as the ether or acetal type, 1,4-dioxane, tetrahydrofuran, 2-methylfuran, tetrahydropyrane and diethylacetal; as the hydrocarbon type, hexane, heptane, octane, isooctane, ligroin, cyclohexane, methylcyclohexane, toluene, xylene, ethylbenzene, styrene and divinylbenzene; as the hydrocarbon halide type, carbon tetrachloride, chloroform, methylene chloride, ethylene chloride, 1,1,1-trichloroethane, 1,1,2-trichloroethane, trichloroethylene, tetrachloroethylene and 1,1,1,2-tetrachloroethane; as the polyhydric alcohol or its derivative type, ethylene glycol, ethylene glycol monomethyl ether, ethylene glycol monoethyl ether, ethylene glycol monoacetate, diethylene glycol, propylene glycol, dipropylene glycol, butanediol, hexylene glycol, 1,5-pentadiol, glycerin monoacetate, glycerin ethers and 1,2,6-hexanetriol; as the fatty acid type, fumaric acid, acetic acid, propionic acid, butyric acid, isobutyric acid, isovaleric acid and lactic acid; as the nitrogen compound type, formamide, N,N-dimethylformamide, acetamide and acetonitrile; and as the sulfur compound type, dimethylsulfoxide.

Among these, preferred are methyl isobutyl ketone, methyl ethyl ketone, cyclohexanone, acetone, toluene, xylene, ethyl acetate and 1-pentanol. Also, for the purpose of controlling the aggregation, an alcohol or polyhydric alcohol-based solvent may be appropriately mixed.

These organic solvents may be used individually or as a mixture, and the total amount of organic solvents contained in the coating composition is preferably from 40 to 98 mass %, more preferably from 60 to 97 mass %, and most preferably from 70 to 95 mass %.

(Other Additives)

The hardcoat layer constituting the optical film of the present invention is preferably enhanced in the scratch resistance by incorporating an organosilane compound which is described in detail later in the paragraph of Low Refractive Index Layer, a so-called sol component (hereinafter sometimes referred to as such), into the coating solution for forming the layer.

(Surfactant for Light-Diffusing Layer)

Particularly, in order to prevent coating unevenness, drying unevenness, point defect or the like and ensure surface uniformity, the coating composition for the hardcoat layer of the present invention preferably contains either one or both of a fluorine-containing surfactant and a silicone-containing surfactant. A fluorine-containing surfactant is more preferred, because the effect of improving surface failures such as coating unevenness, drying unevenness and point defect of the optical film of the present invention can be brought out by the addition in a smaller amount.

The purpose is to impart suitability for high-speed coating while enhancing the surface uniformity and thereby elevate the productivity.

Preferred examples of the fluorine-containing surfactant include a fluoroaliphatic group-containing copolymer (sometimes simply referred to as a "fluorine-based polymer"). The useful fluorine-based polymer is a copolymer of an acrylic or methacrylic resin comprising a repeating unit corresponding to the monomer of (i) below or comprising repeating units corresponding to the monomers of (i) and (ii) below, and a vinyl-based monomer copolymerizable therewith.

(i) Fluoroaliphatic group-containing monomer represented by the following formula (I)

Formula (I):

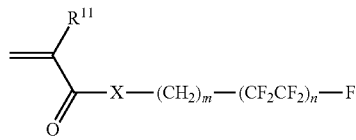

In formula (I), $R^{11}$ represents a hydrogen atom or a methyl group, X represents an oxygen atom, a sulfur atom, or $-N(R^{12})-$, m represents an integer of 1 to 6, and n represents an integer of 2 to 4. $R^{12}$ represents a hydrogen atom or an alkyl group having a carbon number of 1 to 4 (specifically, a methyl group, an ethyl group, a propyl group or a butyl group), preferably a hydrogen atom or a methyl group. X is preferably an oxygen atom.

(ii) Monomer represented by the following formula (II), which is copolymerizable with monomer of (i)

Formula (II):

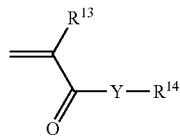

In formula (II), $R^{13}$ represents a hydrogen atom or a methyl group, and Y represents an oxygen atom, a sulfur atom or $-N(R^{15})-$. $R^{15}$ represents a hydrogen atom or alkyl group having a carbon number of 1 to 4 (specifically, a methyl group, an ethyl group, a propyl group or a butyl group), preferably a hydrogen atom or a methyl group. Y is preferably an oxygen atom, $-N(H)-$ or $-N(CH_3)-$.

$R^{14}$ represents a linear, branched or cyclic alkyl group having a carbon number of 4 to 20, which may have a substituent, or an alkyl group containing a poly-(alkyleneoxy) group.

Examples of the substituent for the alkyl group of $R^{14}$ include, but are not limited to, a hydroxy group, an alkylcarbonyl group, an arylcarbonyl group, a carboxyl group, an alkyl ether group, an aryl ether group, a halogen atom (e.g., fluorine, chlorine, bromine), a nitro group, a cyano group and an amino group. Suitable examples of the linear, branched or cyclic alkyl group having a carbon number of 4 to 20 include a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadecyl group and an eicosanyl group, which may be linear or branched, and further include a monocyclic cycloalkyl group such as cyclohexyl group and cycloheptyl group, and a polycyclic cycloalkyl group such as bicycloheptyl group, bicyclodecyl group, tricycloundecyl group, tetracyclo-dodecyl group, adamantyl group, norbornyl group and tetracyclodecyl group.

The amount of the fluoroaliphatic group-containing monomer represented by formula (I) used in the fluorine-based polymer for use in the light-diffusing layer of the present invention is 10 mol % or more, preferably from 15 to 70 mol %, more preferably 20 to 60 mol %, based on respective monomers of the fluorine-based polymer.

The mass average molecular weight of the fluorine-based polymer is preferably from 3,000 to 100,000, more preferably from 5,000 to 80,000.

Furthermore, the amount added of the fluorine-based polymer for use in the hardcoat layer of the present invention is preferably from 0.001 to 5 mass %, more preferably from 0.005 to 3 mass %, still more preferably from 0.01 to 1 mass %, based on the coating solution. When the amount of the fluorine-based polymer added is 0.001 mass % or more, a sufficiently high effect can be provided, and when the amount added is 5 mass % or less, the coating film can be satisfactorily dried and good performance (for example, reflectance and scratch resistance) as the coating film can be obtained.

Specific examples of the structure of the fluorine-based polymer containing a repeating unit corresponding to the fluoroaliphatic group-containing monomer represented by formula (I) are set forth below, but the present invention is not limited thereto. In the formulae, the numeral indicates a molar ratio of respective monomer components, and Mw indicates a mass average molecular weight.

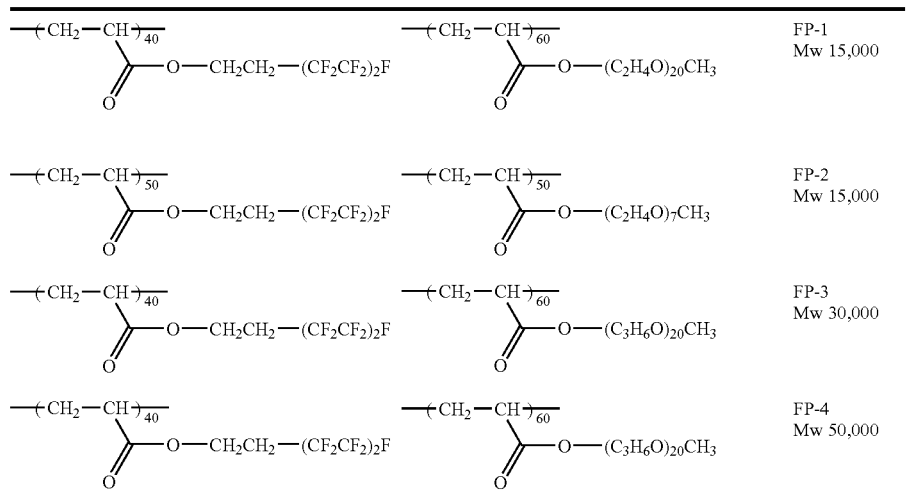

| | | |
|---|---|---|
| —(CH₂—CH)₄₅— \| C(=O)—O—CH₂CH₂—(CF₂CF₂)₃F | —(CH₂—CH)₅₅— \| C(=O)—O—(C₂H₄O)₇CH₃ | FP-5 Mw 15,000 |
| —(CH₂—CH)₄₀— \| C(=O)—O—CH₂CH₂—(CF₂CF₂)₃F | —(CH₂—CH)₆₀— \| C(=O)—O—(C₃H₆O)₂₀CH₃ | FP-6 Mw 7,000 |
| —(CH₂—CH)₃₅— \| C(=O)—O—CH₂CH₂—(CF₂CF₂)₃F | —(CH₂—CH)₆₅— \| C(=O)—O—(C₃H₆O)₂₀CH₃ | FP-7 Mw 20,000 |
| —(CH₂—C(CH₃))₄₀— \| C(=O)—O—CH₂CH₂—(CF₂CF₂)₃F | —(CH₂—CH)₆₀— \| C(=O)—O—(C₂H₄O)₂₀CH₃ | FP-8 Mw 15,000 |
| —(CH₂—C(CH₃))₄₅— \| C(=O)—O—CH₂CH₂—(CF₂CF₂)₃F | —(CH₂—CH)₅₅— \| C(=O)—O—(C₃H₆O)₂₀CH₃ | FP-9 Mw 40,000 |
| —(CH₂—CH)₄₀— \| C(=O)—O—CH₂CH₂—(CF₂CF₂)₃F | —(CH₂—CH)₆₀— \| C(=O)—O—(C₂H₄O)₄CH₃ | FP-10 Mw 15,000 |
| —(CH₂—CH)₄₀— \| C(=O)—O—CH₂CH₂—(CF₂CF₂)₃F | —(CH₂—CH)₆₀— \| C(=O)—O—(C₃H₆O)₇(C₂H₄O)₁₀CH₃ | FP-11 Mw 20,000 |
| —(CH₂—CH)₃₅— \| C(=O)—O—CH₂CH₂—(CF₂CF₂)₃F | —(CH₂—CH)₆₅— \| C(=O)—O—(C₃H₆O)₇(C₂H₄O)₁₀CH₃ | FP-12 Mw 25,000 |

However, use of the fluorine-based polymer described above causes a problem that due to segregation of an F atom-containing functional group on the layer surface, the surface energy of the layer decreases and when a low refractive index layer is overcoated on the light-diffusing layer, the antireflection performance is deteriorated. This is presumed to occur because the wettability of the curable composition used for forming the low refractive index layer is worsened and fine unevenness undetectable with an eye is generated in the low refractive index layer. In order to solve such a problem, it is effective to adjust the structure and amount added of the fluorine-based polymer and thereby control the surface energy of the layer to preferably from 20 to 50 mN·m$^{-1}$, more preferably from 30 to 40 mN·m$^{-1}$. For the realization of such a surface energy, the F/C which is a ratio of a peak derived from a fluorine atom to a peak derived from a carbon atom as measured by X-ray photoelectron spectroscopy is preferably from 0.1 to 1.5.

Also, in the case of coating an upper layer, when a fluorine-based polymer capable of being extracted into a solvent used for forming the upper layer is selected, uneven distribution to the lower layer surface (=interface) does not occur and adhesion between the upper layer and the lower layer is ensured, so that even in the high-speed coating, the surface state uniformity can be maintained and an optical film having high scratch resistance can be provided. Furthermore, the purpose can also be achieved by preventing the reduction in the surface free energy and thereby controlling the surface energy of the light-diffusing layer before coating of the low refractive index layer to fall within the above-described range. Examples of such a material include a copolymer of an acrylic or methacrylic resin containing a repeating unit corresponding to a fluoroaliphatic group-containing monomer represented by the following formula (III), and a vinyl-based monomer copolymerizable therewith.

(iii) Fluoroaliphatic group-containing monomer represented by the following formula (III)

Formula (III):

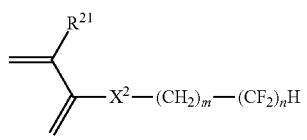

In formula (III), $R^{21}$ represents a hydrogen atom, a halogen atom or a methyl group, preferably a hydrogen atom or a methyl group. $X^2$ represents an oxygen atom, a sulfur atom or —N(R$^{22}$)—, preferably an oxygen atom or —N(R$^{22}$)—, more preferably an oxygen atom. m represents an integer of 1 to 6 (preferably from 1 to 3, more preferably 1), and n represents an integer of 1 to 18 (preferably from 4 to 12, more preferably from 6 to 8). R$^{22}$ represents a hydrogen atom or an alkyl group having a carbon number of 1 to 8 which may have a substituent, preferably a hydrogen atom or an alkyl group having a carbon number of 1 to 4, more preferably a hydrogen atom or a methyl group.

Also, in the fluorine-based polymer, two or more kinds of the fluoroaliphatic group-containing monomers represented by formula (III) may be contained as constituent components.

(iv) A monomer copolymerizable with the monomer of (iii), represented by the following formula (IV) may also be used.

Formula (IV):

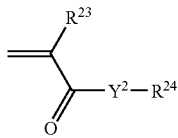

In formula (IV), R$^{23}$ represents a hydrogen atom, a halogen atom or a methyl group, preferably a hydrogen atom or a methyl group. Y$^2$ represents an oxygen atom, a sulfur atom or —N(R$^{25}$)—, preferably an oxygen atom or —N(R$^{25}$)—, more preferably an oxygen atom. R$^{25}$ represents a hydrogen atom or an alkyl group having a carbon number of 1 to 8, preferably a hydrogen atom or an alkyl group having a carbon number of 1 to 4, more preferably a hydrogen atom or a methyl group.

R$^{24}$ represents a linear, branched or cyclic alkyl group having a carbon number of 1 to 20 which may have a substituent, an alkyl group containing a poly(alkyleneoxy) group, or an aromatic group (e.g., phenyl, naphthyl) which may have a substituent. R$^{24}$ is preferably a linear, branched or cyclic alkyl group having a carbon number of 1 to 12 or an aromatic group having a total carbon number of 6 to 18, more preferably a linear, branched or cyclic alkyl group having a carbon number of 1 to 8.

Specific examples of the structure of the fluorine-based polymer containing a repeating unit corresponding to the fluoroaliphatic group-containing monomer represented by formula (III) are set forth below, but the present invention is not limited thereto. In the formulae, the numeral indicates a molar ratio of respective monomer components, and Mw indicates a mass average molecular weight.

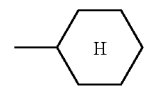

| | R | n | Mw |
|---|---|---|---|
| P-1 | H | 4 | 8000 |
| P-2 | H | 4 | 16000 |
| P-3 | H | 4 | 33000 |
| P-4 | CH$_3$ | 4 | 12000 |
| P-5 | CH$_3$ | 4 | 28000 |
| P-6 | H | 6 | 8000 |
| P-7 | H | 6 | 14000 |
| P-8 | H | 6 | 29000 |

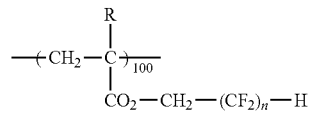

| | R | n | Mw |
|---|---|---|---|
| P-9 | CH$_3$ | 6 | 10000 |
| P-10 | CH$_3$ | 6 | 21000 |
| P-11 | H | 8 | 4000 |
| P-12 | H | 8 | 16000 |
| P-13 | H | 8 | 31000 |
| P-14 | CH$_3$ | 8 | 3000 |

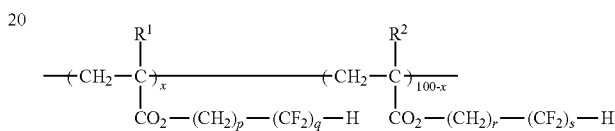

| | x | R$^1$ | p | q | R$^2$ | r | s | Mw |
|---|---|---|---|---|---|---|---|---|
| P-15 | 50 | H | 1 | 4 | CH$_3$ | 1 | 4 | 10000 |
| P-16 | 40 | H | 1 | 4 | H | 1 | 6 | 14000 |
| P-17 | 60 | H | 1 | 4 | CH$_3$ | 1 | 6 | 21000 |
| P-18 | 10 | H | 1 | 4 | H | 1 | 8 | 11000 |
| P-19 | 40 | H | 1 | 4 | H | 1 | 8 | 16000 |
| P-20 | 20 | H | 1 | 4 | CH$_3$ | 1 | 8 | 8000 |
| P-21 | 10 | CH$_3$ | 1 | 4 | CH$_3$ | 1 | 8 | 7000 |
| P-22 | 50 | H | 1 | 6 | CH$_3$ | 1 | 6 | 12000 |
| P-23 | 50 | H | 1 | 6 | CH$_3$ | 1 | 6 | 22000 |
| P-24 | 30 | H | 1 | 6 | CH$_3$ | 1 | 6 | 5000 |

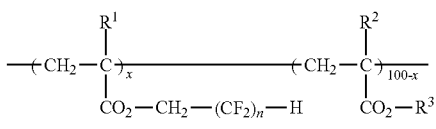

| | x | R$^1$ | n | R$^2$ | R$^3$ | Mw |
|---|---|---|---|---|---|---|
| FP-148 | 80 | H | 4 | CH$_3$ | CH$_3$ | 11000 |
| FP-149 | 90 | H | 4 | H | C$_4$H$_9$(n) | 7000 |
| FP-150 | 95 | H | 4 | H | C$_6$H$_{13}$(n) | 5000 |
| FP-151 | 90 | CH$_3$ | 4 | H | CH$_2$CH(C$_2$H$_5$)C$_4$H$_9$(n) | 15000 |
| FP-152 | 70 | H | 6 | CH$_3$ | C$_2$H$_5$ | 18000 |
| FP-153 | 90 | H | 6 | CH$_3$ | 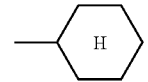 | 12000 |
| FP-154 | 80 | H | 6 | H | C$_4$H$_9$(sec) | 9000 |
| FP-155 | 90 | H | 6 | H | C$_{12}$H$_{25}$(n) | 21000 |
| FP-156 | 60 | CH$_3$ | 6 | H | CH$_3$ | 15000 |
| FP-157 | 60 | H | 8 | H | CH$_3$ | 10000 |
| FP-158 | 70 | H | 8 | H | C$_2$H$_5$ | 24000 |
| FP-159 | 70 | H | 8 | H | C$_4$H$_9$(n) | 5000 |
| FP-160 | 50 | H | 8 | H | C$_4$H$_9$(n) | 16000 |
| FP-161 | 80 | H | 8 | CH$_3$ | C$_4$H$_9$(iso) | 13000 |
| FP-162 | 80 | H | 8 | CH$_3$ | C$_4$H$_9$(t) | 9000 |
| FP-163 | 60 | H | 8 | H | ⬡—H | 7000 |

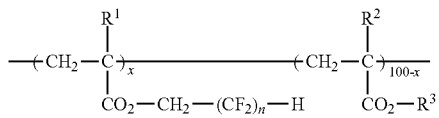

| | x | R¹ | n | R² | R³ | Mw |
|---|---|---|---|---|---|---|
| FP-164 | 80 | H | 8 | H | CH$_2$CH(C$_2$H$_6$)C$_4$H$_9$(n) | 8000 |
| FP-165 | 90 | H | 8 | H | C$_{12}$H$_{25}$(n) | 6000 |
| FP-166 | 80 | CH$_3$ | 8 | CH$_3$ | C$_4$H$_9$(sec) | 18000 |
| FP-167 | 70 | CH$_3$ | 8 | CH$_3$ | CH$_3$ | 22000 |
| FP-168 | 70 | H | 10 | CH$_3$ | H | 17000 |
| FP-169 | 90 | H | 10 | H | H | 9000 |

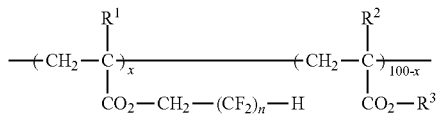

| | x | R¹ | n | R² | R³ | Mw |
|---|---|---|---|---|---|---|
| FP-170 | 95 | H | 4 | CH$_3$ | —(CH$_2$CH$_2$O)$_2$—H | 18000 |
| FP-171 | 80 | H | 4 | H | —(CH$_2$CH$_2$O)$_2$—CH$_3$ | 16000 |
| FP-172 | 80 | H | 4 | H | —(C$_8$H$_6$O)$_7$—H | 24000 |
| FP-173 | 70 | CH$_3$ | 4 | H | —(C$_3$H$_6$O)$_{13}$—H | 18000 |
| FP-174 | 90 | H | 6 | H | —(CH$_2$CH$_2$O)$_2$—H | 21000 |
| FP-175 | 90 | H | 6 | CH$_3$ | —(CH$_2$CH$_2$O)$_8$—H | 9000 |
| FP-176 | 80 | H | 6 | H | —(CH$_2$CH$_2$O)$_2$—C$_4$H$_9$(n) | 12000 |
| FP-177 | 80 | H | 6 | H | —(C$_3$H$_6$O)$_7$—H | 34000 |
| FP-178 | 75 | F | 6 | H | —(C$_3$H$_6$O)$_{13}$—H | 11000 |
| FP-179 | 85 | CH$_3$ | 6 | CH$_3$ | —(C$_3$H$_6$O)$_{20}$—H | 18000 |
| FP-180 | 95 | CH$_3$ | 6 | CH$_3$ | —CH$_2$CH$_2$OH | 27000 |
| FP-181 | 80 | H | 8 | CH$_3$ | —(CH$_2$CH$_2$O)$_8$—H | 12000 |
| FP-182 | 95 | H | 8 | H | —(C$_2$CH$_2$O)$_9$—CH$_3$ | 20000 |
| FP-183 | 90 | H | 8 | H | —(C$_3$H$_6$O)$_7$—H | 8000 |
| FP-184 | 95 | H | 8 | H | —(C$_3$H$_6$O)$_{20}$—H | 15000 |
| FP-185 | 90 | F | 8 | H | —(C$_3$H$_6$O)$_{13}$—H | 12000 |
| FP-186 | 80 | H | 8 | CH$_3$ | —(CH$_2$CH$_2$O)$_2$—H | 20000 |
| FP-187 | 95 | CH$_3$ | 8 | H | —(CH$_2$CH$_2$O)$_9$—CH$_3$ | 17000 |
| FP-188 | 90 | CH$_3$ | 8 | H | —(C$_3$H$_6$O)$_7$—H | 34000 |
| FP-189 | 80 | H | 10 | H | —(CH$_2$CH$_2$O)$_3$—H | 19000 |
| FP-190 | 90 | H | 10 | H | —(C$_3$H$_6$O)$_7$—H | 8000 |
| FP-191 | 80 | H | 12 | H | —(CH$_2$CH$_2$O)$_7$—CH$_3$ | 7000 |
| FP-192 | 95 | CH$_3$ | 12 | H | —(C$_3$H$_6$O)$_7$—H | 10000 |

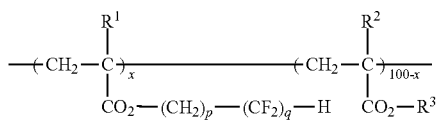

| | x | R¹ | p | q | R² | R³ | Mw |
|---|---|---|---|---|---|---|---|
| FP-193 | 80 | H | 2 | 4 | H | C$_4$H$_9$(n) | 18000 |
| FP-194 | 90 | H | 2 | 4 | H | —(CH$_2$CH$_2$O)$_9$—CH$_3$ | 16000 |
| FP-195 | 90 | CH$_3$ | 2 | 4 | F | C$_6$H$_{13}$(n) | 24000 |
| FP-196 | 80 | CH$_3$ | 1 | 6 | F | C$_4$H$_9$(n) | 18000 |
| FP-197 | 95 | H | 2 | 6 | H | —(C$_3$H$_6$O)$_7$—H | 21000 |

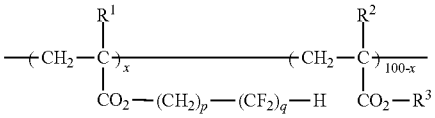

| | x | R¹ | p | q | R² | R³ | Mw |
|---|---|---|---|---|---|---|---|
| FP-198 | 90 | CH$_3$ | 3 | 6 | H | —CH$_2$CH$_2$OH | 9000 |
| FP-199 | 75 | H | 1 | 8 | F | CH$_3$ | 12000 |
| FP-200 | 80 | H | 2 | 8 | H | CH$_2$CH(C$_2$H$_5$)C$_4$H$_9$(n) | 34000 |
| FP-201 | 90 | CH$_3$ | 2 | 8 | H | —(C$_3$H$_6$O)$_7$—H | 11000 |
| FP-202 | 80 | H | 3 | 8 | CH$_3$ | CH$_3$ | 18000 |
| FP-203 | 90 | H | 1 | 10 | F | C$_4$H$_9$(n) | 27000 |
| FP-204 | 95 | H | 2 | 10 | H | —(CH$_2$CH$_2$O)$_9$—CH$_3$ | 12000 |
| FP-205 | 85 | CH$_3$ | 2 | 10 | CH$_3$ | C$_4$H$_9$(n) | 20000 |
| FP-206 | 80 | H | 1 | 12 | H | C$_6$H$_{13}$(n) | 8000 |
| FP-207 | 90 | H | 1 | 12 | H | —(C$_3$H$_6$O)$_{13}$—H | 15000 |
| FP-208 | 60 | CH$_3$ | 3 | 12 | CH$_3$ | C$_2$H$_5$ | 12000 |
| FP-209 | 60 | H | 1 | 16 | H | CH$_2$CH(C$_2$H$_5$)C$_4$H$_9$(n) | 20000 |
| FP-210 | 80 | CH$_3$ | 1 | 16 | H | —(CH$_2$CH$_2$O)$_2$—C$_4$H$_9$(n) | 17000 |
| FP-211 | 90 | H | 1 | 18 | H | —CH$_2$CH$_2$OH | 34000 |
| FP-212 | 60 | H | 3 | 18 | CH$_3$ | CH$_3$ | 19000 |

Furthermore, when the surface energy is prevented from reduction at the time of overcoating the low refractive index layer on the hardcoat layer, deterioration of the antireflection performance can be prevented. A fluorine-based polymer is used at the coating of the light-diffusing layer to reduce the surface tension of the coating solution so that the surface state uniformity can be enhanced and the high productivity by high-speed coating can be maintained, and after the coating of the antiglare layer, a surface treatment such as corona treatment, UV treatment, heat treatment, saponification treatment or solvent treatment, preferably a corona treatment, is applied to prevent reduction in the surface free energy so that the surface energy of the light-diffusing layer before coating of the low refractive index layer can be controlled to fall within the above-described range and in turn the purpose can be achieved.

Also, a thixotropy agent may be added to the coating composition for forming the hardcoat layer of the present invention. Examples of the thixotropy agent include silica and mica each in a size of 0.1 μm or less. The suitable content of this additive is usually on the order of 1 to 10 parts by mass per 100 parts by mass of the ultraviolet-curable resin.

The viscosity of the coating composition for forming the hardcoat layer of the present invention is preferably from 4 to 300 mPa·s, more preferably from 10 to 200 mPa·s, still more preferably from 20 to 150 mPa·s. Within this range, the hardcoat layer can be efficiently coated with good coated surface state. Particularly, in combination with a die coating method, the hardcoat layer can be stably coated at a relatively high viscosity.

The optical film of the present invention preferably has a correlation between the intensity distribution of scattered light as measured by a goniophotometer and the effect of improving the viewing angle. As a result of intensive studies, in order to achieve the desired visibility, the intensity of scattered light particularly at 30° having a correlation with the effect of improving the viewing angle is preferably from 0.01 to 0.2%, more preferably from 0.02 to 0.15%, still more preferably from 0.03 to 0.1%, based on the intensity of light at an outgoing angle of 0° in the scattered light profile.

The scattered light profile can be obtained by measuring the prepared light-scattering film with use of an automatic goniophotometer, Model GP-5, manufactured by Murakami Color Research Laboratory.

The strength of the hardcoat layer is preferably H or more, more preferably 2H or more, and most preferably 3H or more, in the pencil hardness test according to JIS K5400.

Furthermore, in the Taber test according to JIS K5400, the abrasion loss of the specimen between before and after test is preferably smaller.

[Low Refractive Index Layer]

The optical film of the present invention can be used also as an antireflection film by providing a layer (low refractive index layer) with the refractive index being lower than that of the transparent support, on the hardcoat layer or light-diffusing hardcoat layer.

The low refractive index is preferably a cured film formed by coating, drying and curing, for example, a curable composition mainly comprising a fluorine-containing polymer and/or a polyfunctional ionizing radiation-curable monomer. Also, the curable composition preferably further contains an organosilane compound, its hydrolysate and/or a partial condensate thereof.

The refractive index of the low refractive index layer in the antireflection film of the present invention is preferably from 1.20 to 1.48, more preferably from 1.30 to 1.46.

[Fluorine-Containing Polymer for Low Refractive Index Layer]

In the case of performing the coating and curing while transporting a roll film in the web form, from the standpoint of enhancing the productivity, the fluorine-containing polymer is preferably a polymer giving a cured film in which the coefficient of dynamic friction of the film is from 0.03 to 0.20, the contact angle for water is from 90 to 120° and the slipping angle of pure water is 70° or less, and being crosslinked by the effect of heat or ionizing radiation.

Also, when the optical film of the present invention is loaded on an image display device, the peel force with a commercially available adhesive tape is preferably lower because a seal or memo attached can be easily peeled off, and the peel force is preferably 500 gf (4.9 N) or less, more preferably 300 gf (2.9 N) or less, and most preferably 100 gf (0.98 N) or less. Furthermore, as the surface hardness is higher, scratching is less caused. Therefore, the surface hardness as measured by a microhardness meter is preferably 0.3 GPa or more, more preferably 0.5 GPa or more.

The fluorine-containing polymer for use in the low refractive index layer is preferably a fluorine-containing polymer containing a fluorine atom in the range from 35 to 80 mass % and further containing a crosslinking or polymerizable functional group. Examples thereof include a hydrolysate of a perfluoroalkyl group-containing silane compound [e.g., (heptadecafluoro-1,1,2,2-tetrahydrodecyl)triethoxysilane], a dehydrating condensate thereof, and a fluorine-containing copolymer comprising, as constituent components, a fluorine-containing monomer unit and a crosslinking reactive unit. In the case of a fluorine-containing copolymer, the main chain preferably comprises only a carbon atom. That is, it is preferred that the main chain skeleton does not contain an oxygen atom, a nitrogen atom and the like.

Specific examples of the fluorine-containing monomer unit include fluoroolefins (e.g., fluoroethylene, vinylidene fluoride, tetrafluoroethylene, perfluorooctylethylene, hexafluoropropylene, perfluoro-2,2-dimethyl-1,3-dioxol), partially or completely fluorinated alkyl ester derivatives of (meth) acrylic acid (e.g., VISCOAT 6FM (produced by Osaka Organic Chemical Industry Ltd.), M-2020 (produced by Daikin Industries, Ltd.)), and completely or partially fluorinated vinyl ethers. Among these, perfluoroolefins are preferred and in view of refractive index, solubility, transparency, availability and the like, hexafluoropropylene is more preferred.

Examples of the crosslinking reactive unit include a constituent unit obtained by polymerizing a monomer previously having a self-crosslinking functional group within the molecule, such as glycidyl (meth)acrylate and glycidyl vinyl ether; and a constituent unit obtained by polymerizing a monomer having a carboxyl group, a hydroxy group, an amino group, a sulfo group or the like [a monomer such as (meth)acrylic acid, methylol (meth)acrylate, hydroxyalkyl (meth)acrylate, allyl acrylate, hydroxyethyl vinyl ether, hydroxybutyl vinyl ether, maleic acid and crotonic acid] and introducing into the obtained constituent unit a crosslinking reactive group such as (meth)acryloyl group through a polymer reaction (for example, the crosslinking reactive group can be introduced by causing an acrylic acid chloride to act on a hydroxyl group).

Other than the above-described fluorine-containing monomer unit and crosslinking reactive unit, in view of solubility in a solvent and transparency or the like of the film, another polymerization unit may also be introduced by appropriately copolymerizing a monomer not containing a fluorine atom. The monomer unit which can be used in combination is not particularly limited and examples thereof include olefins [e.g., ethylene, propylene, isoprene, vinyl chloride, vinylidene chloride], acrylic acid esters [e.g., methyl acrylate, ethyl acrylate, 2-ethylhexyl acrylate], methacrylic acid esters [e.g., methyl methacrylate, ethyl methacrylate, butyl methacrylate, ethylene glycol dimethacrylate], styrene derivatives [e.g., styrene, divinylbenzene, vinyltoluene, α-methylstyrene], vinyl ethers [e.g., methyl vinyl ether, ethyl vinyl ether, cyclohexyl vinyl ether], vinyl esters [e.g., vinyl acetate, vinyl propionate, vinyl cinnamate], acrylamides [e.g., N-tert-butylacrylamide, N-cyclohexylacrylamide], methacrylamides and acrylonitrile derivatives.

With such a fluorine-containing polymer, a hardening agent may be appropriately used in combination as described in JP-A-10-25388 and JP-A-10-147739.

The fluorine-containing polymer particularly useful in the present invention is a random copolymer of a perfluoroolefin and vinyl ethers or esters. In particular, the fluorine-containing polymer preferably has a group capable of undergoing a crosslinking reaction by itself [for example, a radical reactive group such as (meth)acryloyl group, or a ring-opening polymerizable group such as epoxy group and oxetanyl group].

The crosslinking reactive group-containing polymerization unit preferably occupies from 5 to 70 mol %, more preferably from 30 to 60 mol %, in all polymerization units of the polymer.

A preferred structure of the fluorine-containing polymer for the low refractive index layer of the present invention is a copolymer represented by formula 1 of JP-A-2005-283652. A more preferred structure is represented by formula 2 of the same patent publication and as for the content and specific examples, those described in this patent publication are preferred. Also, such a polymer can be synthesized by the method described in the patent publication above.

[Organosilane Compound]

The hardcoat layer or low refractive index layer for use in the present invention is enhanced in the scratch resistance by incorporating an organosilane compound, a so-called sol component (hereinafter sometimes referred to as such), into the coating solution for forming the layer. Particularly, the low refractive index layer or a layer adjacent thereto can be enhanced in both the antireflection ability and the scratch resistance. This sol component is condensed to form a cured product during drying and heating after the coating of the coating solution and works out to a part of the binder of the layer. In the case where the cured product has a polymerizable unsaturated bond, a binder having a three-dimensional structure is formed upon irradiation with actinic rays.

The organosilane compound is preferably represented by the following formula 21:

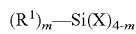  Formula 21:

In formula 21, $R^1$ represents a substituted or unsubstituted alkyl group or a substituted or unsubstituted aryl group. The alkyl group is preferably an alkyl group having a carbon number of 1 to 30, more preferably from 1 to 16, still more preferably from 1 to 6. Specific examples of the alkyl group include methyl, ethyl, propyl, isopropyl, hexyl, decyl and hexadecyl. Examples of the aryl group include phenyl and naphthyl, with a phenyl group being preferred.

X represents a hydroxyl group or a hydrolyzable group, and examples thereof include an alkoxy group (preferably an alkoxy group having a carbon number of 1 to 5, e.g., methoxy, ethoxy), a halogen atom (e.g., Cl, Br, I) and a group represented by $R^2COO$ (wherein $R^2$ is preferably a hydrogen atom or an alkyl group having a carbon number of 1 to 6, e.g., $CH_3COO$, $C_2H_5COO$). Among these, an alkoxy group is preferred, and a methoxy group and an ethoxy group are more preferred. m represents an integer of 1 to 3 and is preferably 1 or 2.

When a plurality of $R^1$'s or X's are present, the plurality of $R^1$'s or X's may be the same or different.

The substituent contained in $R^1$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic hetero-cyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted.

$R^1$ is preferably a substituted alkyl group or a substituted aryl group.

Among the compounds represented by formula 21, an organosilane compound having a vinyl polymerizable substituent, represented by the following formula 22, is preferred.

Formula 22:

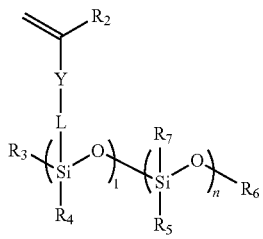

In formula 22, $R_2$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R_2$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y represents a single bond, *—COO—**, *—CONH—** or *—O—** and is preferably a single bond, *—COO—** or *—CONH—**, more preferably a single bond or *—COO—**, still more preferably *—COO—**. * denotes the position bonded to =C($R_2$)— and ** denotes the position bonded to L.

L represents a divalent linking chain. Specific examples thereof include a substituted or unsubstituted alkylene group, a substituted or unsubstituted arylene group, a substituted or unsubstituted alkylene group having in the inside thereof a linking group (e.g., ether, ester, amido), and a substituted or unsubstituted arylene group having in the inside thereof a linking group. L is preferably a substituted or unsubstituted alkylene group, a substituted or unsubstituted arylene group or an alkylene group having in the inside thereof a linking group, more preferably an unsubstituted alkylene group, an unsubstituted arylene group or an alkylene group having in the inside thereof an ether or ester linking group, still more preferably an unsubstituted alkylene group or an alkylene group having in the inside thereof an ether or ester linking group. Examples of the substituent include a halogen, a hydroxyl group, a mercapto group, a carboxyl group, an epoxy group, an alkyl group and an aryl group. These substituents each may be further substituted.

l and m each represents a molar ratio. l represents a number satisfying the mathematical formula: l=100-m, and m represents a number of 0 to 50. m is preferably a number of 5 to 40, more preferably a number of 10 to 30.

$R_3$ to $R_5$ each is preferably a chlorine atom, a hydroxyl group, an unsubstituted alkyl group or an unsubstituted alkoxy group, more preferably a hydroxyl group or an alkoxy group having a carbon number of 1 to 6, still more preferably a hydroxyl group or an alkoxy group having a carbon number of 1 to 3.

$R_6$ represents a hydrogen atom or an alkyl group. The alkyl group is preferably a methyl group or an ethyl group.

$R_7$ represents a substituted or unsubstituted alkyl group, a substituted or unsubstituted aryl group or a hydroxyl group, preferably an alkyl group having a carbon number of 1 to 3 or a hydroxyl group.

Specific examples of the starting material for the compound represented by formula 22 are set forth below, but the present invention is not limited thereto.

N-1 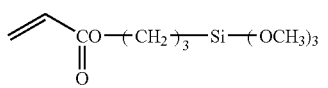
N-2 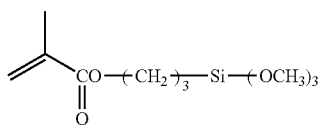
N-3 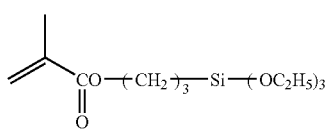
N-4 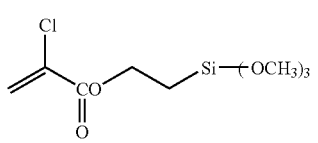
N-5 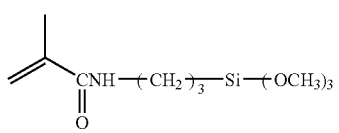
N-6 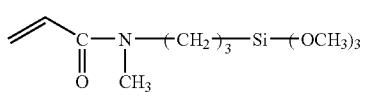
N-7 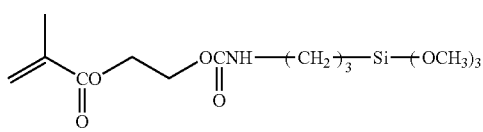
N-8 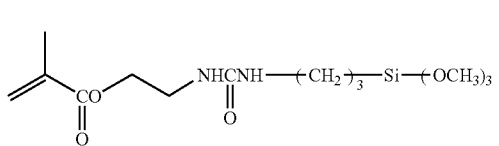
N-9 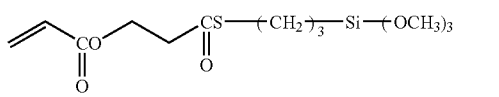
N-10 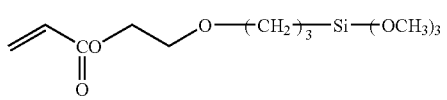
N-11 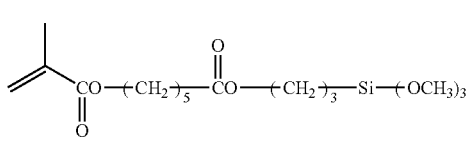
N-12 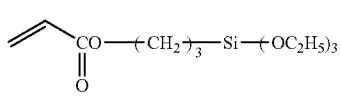
N-13 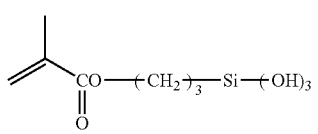
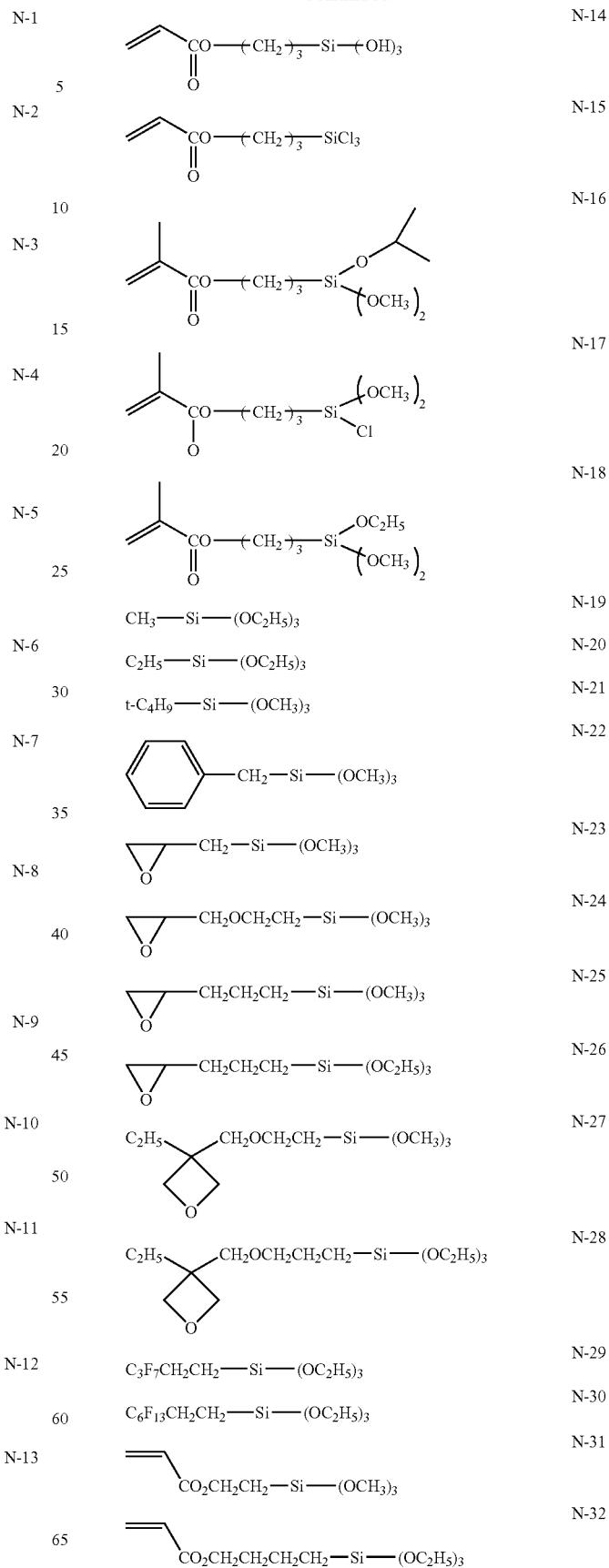

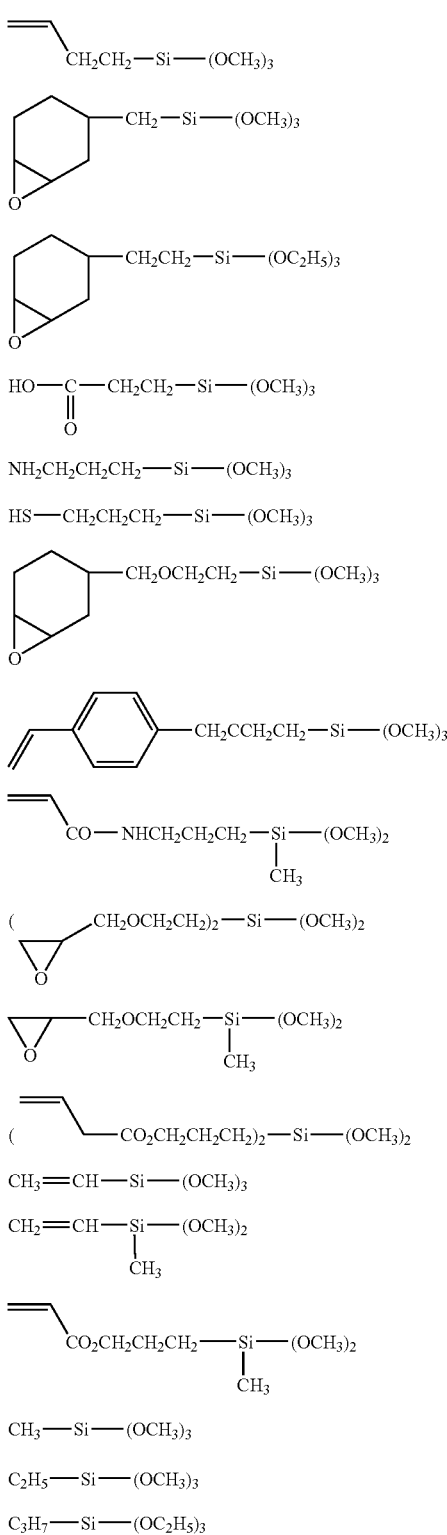

more preferably from 50 to 100 mass %, still more preferably from 70 to 100 mass %, yet still more preferably from 90 to 100 mass %.

The content of the vinyl polymerizable group-containing organosilane in at least either one of the hydrolysate of organosilane and a partial condensate thereof (the content of the vinyl polymerizable group-containing organosilane in the organosilane raw material used at the time of synthesizing the organosilane compound represented by formula 21 or 22, its hydrolysate and/or a partial condensate thereof) is preferably from 50 to 100 mass %, more preferably from 60 to 95 mass %, still more preferably from 70 to 95 mass %.

The sol component for use in the present invention is prepared by the hydrolysis and/or partial condensation of the organosilane.

The hydrolysis and condensation reaction is performed by adding water in an amount of 0.05 to 2.0 mol, preferably from 0.1 to 1.0 mol, per mol of the hydrolyzable group (X) and stirring the resulting solution at 25 to 100° C. in the presence of a catalyst for use in the present invention.

In at least either one of the hydrolysate of organosilane of the present invention and a partial condensate thereof, either the hydrolysate of the vinyl polymerizable group-containing organosilane or the partial condensate thereof preferably has a mass average molecular weight of 450 to 20,000, more preferably from 500 to 10,000, still more preferably from 550 to 5,000, yet still more preferably from 600 to 3,000, excluding the components having a molecular weight of less than 300.

Out of the components having a molecular weight of 300 or more in the hydrolysate of organosilane and/or a partial condensate thereof, the content of the components having a molecular weight of more than 20,000 is preferably 10 mass % or less, more preferably 5 mass % or less, still more preferably 3 mass % or less.

The hydrolysate of the organosilane compound and the partial condensate for use in the present invention are described in detail.

The hydrolysis reaction of organosilane and the subsequent condensation reaction are generally performed in the presence of a catalyst. Examples of the catalyst include inorganic acids such as hydrochloric acid, sulfuric acid and nitric acid; organic acids such as oxalic acid, acetic acid, butyric acid, maleic acid, citric acid, formic acid, methanesulfonic acid and toluenesulfonic acid; inorganic bases such as sodium hydroxide, potassium hydroxide and ammonia; organic bases such as triethylamine and pyridine; metal alkoxides such as triisopropoxy aluminum, tetrabutoxy zirconium, tetrabutyl titanate and dibutyltin dilaurate; metal chelate compounds with the center metal being a metal such as Zr, Ti or Al; and F-containing compounds such as KF and $NH_4F$.

One of these catalysts may be used alone or a plurality of species thereof may be used in combination.

The hydrolysis•condensation reaction of organosilane may be performed without a solvent or in a solvent, but in order to uniformly mix the components, an organic solvent is preferably used. Suitable examples thereof include alcohols, aromatic hydrocarbons, ethers, ketones and esters.

As for the metal chelate compound, any metal chelate compound may be suitably used without particular limitation as long as it is a metal chelate compound where an alcohol represented by the formula: $R^7OH$ (wherein $R^7$ represents an alkyl group having a carbon number of 1 to 10) and a compound represented by the formula: $R^8COCH_2COR^9$ (wherein $R^8$ represents an alkyl group having a carbon number of 1 to 10 and $R^9$ represents an alkyl group having a carbon number of 1 to 10 or an alkoxy group having a carbon number of 1 to Among these, a combination of organosilanes selected from (N-1), (N-2) and (N-25) and from (N-19), (N-48) and (N-49) is preferred.

The content of the vinyl polymerizable group-containing organosilane in the hydrolysate of organosilane and/or a partial condensate thereof is preferably from 30 to 100 mass %, 10) are present as ligands and the center metal is a metal selected from Zr, Ti and Al. Within this category, two or more kinds of metal chelate compounds may be used in combination. The metal chelate compound for use in the present invention is preferably selected from the group consisting of compounds represented by the formulae: $Zr(OR^7)_{p1}(R^8COCHCOR^9)_{p2}$, $Ti(OR^7)_{q1}(R^8COCHCOR^9)_{q2}$ and $Al(OR^7)_{r1}(R^8COCHCOR^9)_{r2}$.

Specific examples of the metal chelate compound include zirconium tri-n-butoxyethylacetoacetate, titanium diisopropoxybis(acetyl acetonate), aluminum diisopropoxyethylacetoacetate and aluminum tris(ethylacetoacetate). One of these metal chelate compounds may be used alone, or two or more species thereof may be mixed and used. Furthermore, a partial hydrolysate of such a metal chelate compound may also be used.

The metal chelate compound is preferably used in a ratio of 0.01 to 50 mass % based on the organosilane compound.

In the coating solution for forming the low refractive index layer or other layers for use in the present invention, at least either one of a β-diketone compound and a β-ketoester compound is preferably added in addition to the composition containing the above-described sol component and metal chelate compound.

The compound for use in the present invention is at least either a β-diketone compound or a β-ketoester compound, represented by the formula: $R^8COCH_2COR^9$.

Specific examples of the β-diketone compound and β-ketoester compound include acetylacetone, methyl acetoacetate, ethyl acetoacetate and acetylacetone. The amount of such a compound added is preferably from 0.1 to 50 mass %, more preferably from 0.5 to 30 mass %, and most preferably from 1 to 15 mass %, based on the entire solid content of the layer containing the compound (the layer to which the compound is added).

(Polyfunctional Ionizing Radiation-Curable Monomer)

The coating composition (coating solution) for forming the low refractive index layer according to the present invention may contain a polyfunctional ionizing radiation-curable monomer. This monomer forms a coating film by bringing about chemical bonding upon irradiation with ionizing radiation after coating and drying the coating composition. The ionizing radiation-curable monomer is a monomer which is cured through a chemical reaction such as polymerization, addition polymerization or condensation polymerization by the effect of ionizing radiation. For example, monomers having an acryl group, a vinyl group, an epoxy group or the like are easily available and preferred.

It is also preferred to contain a heat-curable group in these monomers. For example, a hydroxyl group, an alkoxy group, a carboxyl group, an amino group, an epoxy group or an isocyanate group is preferably contained.

The functional group of the polyfunctional ionizing radiation-curable monomer is preferably bifunctional or greater functional, more preferably trifunctional or greater functional. Specific examples of such an ionizing radiation-curable monomer include the following monomers.

Specific examples of the polyfunctional ionizing radiation-curable monomer include esters of a polyhydric alcohol and a (meth)acrylic acid (for example, ethylene glycol di(meth) acrylate, 1,4-cyclohexane diacrylate, pentaerythritol tetra (meth)acrylate, pentaerythritol tri(meth)acrylate, trimethylolpropane tri(meth)acrylate, trimethylolethane tri(meth) acrylate, dipentaerythritol tetra(meth)acrylate, dipentaerythritol penta(meth)acrylate, dipentaerythritol hexa (meth)acrylate, 1,2,3-cyclohexane tetramethacrylate, polyurethane polyacrylate, and polyester polyacrylate); a vinyl-benzene and derivatives thereof (e.g., 1,4-divinylbenzene, 2-acryloylethyl 4-vinylbenzoate, 1,4-divinylcyclohexanone); a vinylsulfone (e.g., divinylsulfone); an acrylamide (e.g., methylenebisacrylamide); and a methacrylamide. Two or more species of these monomers may be used in combination.

The amount of the polyfunctional ionizing radiation-curable monomer added in the coating composition is generally from 0.01 to 10 mass %, preferably from 0.1 to 5 mass %.

(Inorganic Fine Particle Having Void)

The low refractive index layer according to the present invention preferably contains an inorganic fine particle having a void in the inside of the particle so as to reduce the refractive index. The void is preferably porous or hollow, and the fine particle may also have a structure that inorganic fine particles are connected like a chain to form voids. In particular, an inorganic fine particle having a hollow structure is preferred.

The hollow inorganic fine particle is preferably a silica having a hollow structure. The refractive index of the hollow silica fine particle is preferably from 1.17 to 1.40, more preferably from 1.17 to 1.35, and most preferably from 1.17 to 1.30. The refractive index used here indicates the refractive index of the particle as a whole and does not indicate the refractive index of only silica as an outer shell forming the hollow silica particle. At this time, assuming that the radius of the cavity inside the particle is a and the radius of the outer shell of the particle is b, the porosity x calculated according the following mathematical formula (III) is preferably from 10 to 60%, more preferably from 20 to 60%, and most preferably from 30 to 60%.

$$x=(4\pi a^3/3)/(4\pi b^3/3)\times 100 \qquad \text{(Mathematical Formula III):}$$

If the hollow silica particle is rendered to have a lower refractive index and a higher porosity, the thickness of the outer shell becomes small and the strength as a particle decreases. Therefore, in view of scratch resistance, a particle having a refractive index as low as less than 1.17 cannot be used.

Here, the refractive index of the hollow silica particle is measured by an Abbe's refractometer (manufactured by ATAGO K.K.).

The production method of the hollow silica is described, for example, in JP-A-2001-233611 and JP-A-2002-79616.

The blending amount of the hollow silica is preferably from 1 to 100 mg/m$^2$, more preferably from 5 to 80 mg/m$^2$, still more preferably from 10 to 60 mg/m$^2$. When the blending amount is within this range, excellent scratch resistance and less generation of fine irregularities on the low refractive index layer surface are attained and the appearance (e.g., dense black appearance) and integrated reflectance are enhanced.

The average particle diameter of the hollow silica is preferably from 30 to 150%, more preferably from 35 to 80%, still more preferably from 40 to 60%, of the thickness of the low refractive index layer. In other words, when the thickness of the low refractive index layer is 100 nm, the particle diameter of the hollow silica is preferably from 30 to 150 nm, more preferably from 35 to 80 nm, still more preferably from 40 to 60 nm.

When the particle diameter of the silica fine particle is within this range, reduction in the refractive index and less generation of fine irregularities on the low refractive index layer surface are attained and the appearance (e.g., dense black appearance) and integrated reflectance are enhanced. The silica fine particle may be crystalline or amorphous and is preferably a monodisperse particle. The shape is most preferably spherical but even if infinite form, there arises no problem.

The average particle diameter of the hollow silica can be determined from the electron micrograph.

In the present invention, a cavity-free silica particle may be used in combination with the hollow silica. The particle size of the cavity-free silica is preferably from 30 to 150 nm, more preferably from 35 to 80 nm, and most preferably from 40 to 60 nm.

Also, at least one species of a silica fine particle with the average particle size being less than 25% of the thickness of the low refractive index layer (this fine particle is sometimes referred to as a "small particle-size silica fine particle") is preferably used in combination with the silica fine particle having the above-described particle diameter (this fine particle is sometimes referred to as a "large particle-size silica fine particle").

The small particle-size silica fine particle can be present in a gap between large particle-size silica fine particles and therefore, can contribute as a holding agent for the large particle-size silica fine particle.

The average particle diameter of the small particle-size silica fine particle is preferably from 1 to 20 nm, more preferably from 5 to 15 nm, still more preferably from 10 to 15 nm. Use of such a silica fine particle is preferred in view of the raw material cost and the holding agent effect.

For the purpose of stabilizing the dispersion in a liquid dispersion or coating solution or enhancing the affinity for or binding property with the binder component, the silica fine particle may be subjected to a physical surface treatment such as plasma discharge treatment and corona discharge treatment, or a chemical surface treatment with a surfactant, a coupling agent or the like.

(Fluorine- and/or Silicone-Based Compound)

The low refractive index layer according to the present invention preferably contains a fluorine- and/or silicone-based compound. By virtue of such a compound, the surface free energy can be reduced and in turn, the antifouling property, slipperiness, water resistance and the like can be enhanced.

As for such a compound, a known silicone compound or fluorine-based compound may be used. In the case of adding such a compound, the compound is preferably added in the range from 0.01 to 20 mass %, more preferably from 0.05 to 10 mass %, still more preferably from 0.1 to 5 mass %, based on the entire solid content of the low refractive index layer.

Preferred examples of the silicone-based compound include those containing a plurality of dimethylsilyloxy units as the repeating unit and having a substituent at the chain terminal and/or on the side chain of the compound. The chain of the compound containing dimethylsilyloxy as the repeating unit may contain a structural unit other than dimethylsilyloxy. A plurality of substituents, which may be the same or different, are preferably present. Preferred examples of the substituent include a group containing an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group or an amino group. The molecular weight is not particularly limited but is preferably 100,000 or less, more preferably 50,000 or less, still more preferably from 3,000 to 30,000, and most preferably from 10,000 to 20,000. The silicone atom content of the silicone-based compound is not particularly limited but is preferably 18.0 mass % or more, more preferably from 25.0 to 37.8 mass %, and most preferably from 30.0 to 37.0 mass %. Preferred examples of the silicone-based compound include, but are not limited to, X-22-174DX, X-22-2426, X-22-164B, X22-164C, X-22-170DX, X-22-176D, X-22-1821 and FL100 (all trade names) produced by Shin-Etsu Chemical Co., Ltd.; FM-0725, FM-7725, FM-4421, FM-5521, FM-6621 and FM-1121 produced by Chisso Corp.; DMS-U22, RMS-033, RMS-083, UMS-182, DMS-H21, DMS-H31, HMS-301, FMS121, FMS123, FMS131, FMS141 and FMS221 (all trade names) produced by Gelest; and TSF4460 produced by GE Toshiba Silicones Co., Ltd.

The fluorine-based compound is preferably a compound having a fluoroalkyl group. The fluoroalkyl group preferably has a carbon number of 1 to 20, more preferably from 1 to 10, and may be linear (e.g., —$CF_2CF_3$, —$CH_2(CF_2)_4H$, —$CH_2(CF_2)_8CF_3$, —$CH_2CH_2(CF_2)_4H$), may have a branched structure (e.g., $CH(CF_3)_2$, $CH_2CF(CF_3)_2$, $CH(CH_3)CF_2CF_3$, $CH(CH_3)(CF_2)_5CF_2H$) or an alicyclic structure (preferably a 5- or 6-membered ring, for example, a perfluorocyclohexyl group, a perfluorocyclopentyl group, or an alkyl group substituted by such a group), or may have an ether bond (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$). A plurality of the fluoroalkyl groups may be contained within the same molecule.

The fluorine-based compound preferably further has a substituent which contributes to the bond formation or compatibility with the low refractive index layer film. A plurality of substituents, which may be the same or different, are preferably present. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group and an amino group. The fluorine-based compound may be a polymer or oligomer with a compound not containing a fluorine atom. The molecular weight is not particularly limited. The fluorine atom content of the fluorine-based compound is not particularly limited but is preferably 20 mass % or more, more preferably from 30 to 70 mass %, and most preferably from 40 to 70 mass %. Preferred examples of the fluorine-based compound include, but are not limited to, R-2020, M-2020, R-3833 and M-3833 (all trade names) produced by Daikin Kogyo Co., Ltd.; Megafac F-171, F-172, F-179A and DYFENSA MCF-300 (all trade names) produced by Dai-Nippon Ink & Chemicals, Inc.; and MODIPER F Series produced by NOF Corp.

The fluorine- and/or silicon-containing compound preferably contains, in its molecule, at least one group having reactivity with the binder. Preferred examples of the reactive group include, as the heat-curable type, an active hydrogen, a hydroxyl group and melamine, and as the active energy ray-curable type, a (meth)acryloyl group and an epoxy group. Among these, melamine and a (meth)acryloyl group are more preferred.

In the present invention, for the purpose of preventing aggregation and precipitation of the inorganic filler, it is also preferred to use a dispersion stabilizer in combination in the coating solution for forming each layer. Examples of the dispersion stabilizer which can be used include a polyvinyl alcohol, a polyvinylpyrrolidone, a cellulose derivative, a polyamide, a phosphoric acid ester, a polyether, a surfactant, a silane coupling agent and a titanium coupling agent. In particular, the above-described silane coupling agent is preferred because the film after curing is strong.

The composition for forming the low refractive index layer of the present invention takes a liquid form and is produced by dissolving the above-described organosilane compound, its hydrolysate and/or a partial condensate thereof, and the fluorine-containing polymer and if desired, further adding various additives such as inorganic fine particle, fluorine- and/or silicone-based compound, another binder and radical polymerization initiator, in an appropriate solvent.

At this time, the solid content concentration is appropriately selected according to the usage but is generally on the order of 0.01 to 60 mass %, preferably from 0.5 to 50 mass %, more preferably from 1 to 20 mass %.

The layer thickness after the curing of low refractive index layer is preferably from 10 to 500 nm, more preferably from 20 to 300 nm, still more preferably from 30 to 200 nm.

The addition of additives such as curing agent is not necessarily advantageous in view of film hardness of the low refractive index layer, but in the light of, for example, interface adhesion to the high refractive index layer, a curing agent such as polyisocyanate compound, aminoplast, polybasic acid and its anhydride may be added in a small amount. In the case of adding such an additive, the amount added thereof is preferably from 0 to 30 mass %, more preferably from 0 to 20 mass %, still more preferably from 0 to 10 mass %, based on the entire solid content of the low refractive index layer film.

For the purpose of imparting properties such as dust protection and antistaticity, a known dust inhibitor, antistatic agent or the like such as cationic surfactant and polyoxyalkylene-based compound may be appropriately added. A structural unit of such a dust inhibitor or antistatic agent may be contained as a part of the function in the above-described silicone-based compound or fluorine-based compound. In the case of adding such an additive, the additive is preferably added in the range from 0.01 to 20 mass %, more preferably from 0.05 to 10 mass %, still more preferably from 0.1 to 5 mass %, based on the entire solid content of the low refractive index layer. Preferred examples of the compound include, but are not limited to, Megafac F-150 (trade name) produced by Dai-Nippon Ink & Chemicals, Inc. and SH-3748 (trade name) produced by Toray Dow Corning.

Other layers in the optical film of the present invention are described below.

[Antistatic Layer]

Examples of the method for forming an antistatic layer include conventionally known methods such as a method of coating an electrically conducting coating solution containing an electrically conducting fine particle and a reactive curable resin, and a method of vapor-depositing or sputtering a transparent film-forming metal or metal oxide or the like to form an electrically conducting thin film. The antistatic layer may be formed on a substrate film directly or through a primer layer ensuring firm adhesion to the substrate film. Also, the antistatic layer may be used as a part of the antireflection film. In this case, when the antistatic layer is used as a layer closer to the outermost layer, sufficiently high antistaticity can be obtained even with a small film thickness.

The thickness of the antistatic layer is preferably from 0.01 to 10 µm, more preferably from 0.03 to 7 µm, still more preferably from 0.05 to 5 µm. The surface resistance value (log SR) of the antistatic layer of the present invention at 25° C. and 55% RH is preferably 12 Ω/sq or less, more preferably 10 Ω/sq or less. Also, for satisfying the transparency of the coating film at the same time, the surface resistance value is preferably 5 Ω/sq or more. That is, the surface resistance value of the antistatic layer of the present invention at 25° C. and 55% RH is preferably from 5 to 12 Ω/sq, more preferably from 5 to 10 Ω/sq.

The surface resistance of the antistatic layer may be measured by a four-probe method.

When the surface resistance of the antistatic layer is within the above-described range, a transparent antireflection film with good dust protection can be obtained.

The antistatic layer is preferably an electron conducting type of causing less change in the surface resistance value depending on the ambient temperature and humidity.

It is preferred that the antistatic layer is substantially transparent. Specifically, the haze of the antistatic layer is preferably 10% or less, more preferably 5% or less, still more preferably 3% or less, and most preferably 1% or less. Furthermore, the transmittance for light at a wavelength of 550 nm is preferably 50% or more, more preferably 60% or more, still more preferably 65% or more, and most preferably 70% or more.

The antistatic layer of the present invention has excellent strength. Specifically, the strength of the antistatic layer is, in terms of the pencil hardness with a load of 1 kg (specified in JIS-K-5400), preferably H or more, more preferably 2H or more, still more preferably 3H or more, and most preferably 4H or more.

The electrically conducting inorganic fine particle contained in the antistatic layer of the present invention is preferably formed of a metal oxide or nitride. Examples of the metal oxide or nitride include tin oxide, indium oxide, zinc oxide and titanium nitride. Among these, tin oxide and indium oxide are preferred. The electrically conducting inorganic fine particle comprises such a metal oxide or nitride as the main component and may further contain other elements. The main component means a component having a largest content (mass %) out of the components constituting the particle. Examples of the other element include Ti, Zr, Sn, Sb, Cu, Fe, Mn, Pb, Cd, As, Cr, Hg, Zn, Al, Mg, Si, P, S, B, Nb, In, V and a halogen atom. In order to enhance the electrical conductivity of tin oxide or indium oxide, addition of Sb, P, B, Nb, In, V or a halogen atom is preferred. An Sb-containing tin oxide (ATO) and an Sn-containing indium oxide (ITO) are particularly preferred. The ratio of Sb in ATO is preferably from 3 to 20 mass %, and the ratio of Sn in ITO is preferably from 5 to 20 mass %.

In the antistatic layer, a crosslinked polymer may be used as the binder. The crosslinking polymer preferably has an anionic group. In the crosslinking polymer having an anionic group, the main chain of the anionic group-containing polymer has a crosslinked structure. The anionic group has a function of maintaining the dispersed state of electrically conducting inorganic fine particles, and the crosslinked structure has a function of imparting a film-forming ability to the polymer and strengthening the antistatic layer.

The anionic group-containing crosslinking polymer is preferably a polymer having polyolefin (saturated hydrocarbon), polyether, polyurea, polyurethane, polyester, polyamine, polyamide or the like as the main chain, or a melamine resin. In particular, a polyolefin main chain, a polyether main chain and a polyurea main chain are preferred, a polyolefin main chain and a polyether main chain are more preferred, and a polyolefin main chain is most preferred.

[Transparent Support]

The transparent support for use in the optical film of the present invention is preferably a plastic film. Examples of the polymer for forming the plastic film include a cellulose acylate (e.g., triacetyl cellulose, diacetyl cellulose; as represented by TAC-TD80U and TD80UF produced by Fujifilm Corp.), a polyamide, a polycarbonate, a polyester (e.g., polyethylene terephthalate, polyethylene naphthalate), a polystyrene, a polyolefin, a norbornene-based resin (ARTON, trade name, produced by JSR) and an amorphous polyolefin (ZEONEX, trade name, produced by Nippon Zeon). Among these, triacetyl cellulose, polyethylene terephthalate and polyethylene naphthalate are preferred, and triacetyl cellulose is more preferred.

The triacetyl cellulose comprises a single layer or a plurality of layers. The single-layer triacetyl cellulose is prepared, for example, by drum casting or band casting disclosed in JP-A-7-11055, and the triacetyl cellulose comprising a plurality of layers is prepared by a so-called co-casting method disclosed in JP-A-61-94725 and JP-B-62-43846 (the term "JP-B" as used herein means an "examined Japanese patent publication"). More specifically, these are a method where when a solution (sometimes called a "dope") prepared by dissolving a raw material flake in a solvent such as halogenated hydrocarbons (e.g., dichloromethane), alcohols (e.g., methanol, ethanol, butanol), esters (e.g., methyl formate, methyl acetate) and ethers (e.g., dioxane, dioxolane, diethyl ether), and adding, if desired, various additives such as plasticizer, ultraviolet absorbent, deterioration inhibitor, lubricant and separation accelerator is cast on a support comprising a horizontal endless metal belt or a rotating drum by the use of dope supply means (sometimes called a "die"), a single dope is cast into a single layer in the case of a single-layer triacetyl cellulose, or a high-concentration cellulose ester dope and low-concentration dopes on both sides thereof are co-cast in the case of a triacetyl cellulose comprising a plurality of layers, and the film imparted with rigidity by the drying to some extent on the support is separated from the support and passed through a drying zone by various conveying means to remove the solvent.

The refractive index of the triacetyl cellulose is preferably from 1.46 to 1.49, more preferably from 1.47 to 1.48.

A representative example of the solvent for dissolving the triacetyl cellulose is dichloromethane. However, in view of the global environment or working environment, the solvent preferably contains substantially no halogenated hydrocarbon such as dichloromethane. The term "contain substantially no halogenated hydrocarbon" as used herein means that the proportion of the halogenated hydrocarbon in the organic solvent is less than 5 mass % (preferably less than 2 mass %).

In the case of preparing a triacetyl cellulose dope by using a solvent containing substantially no dichloromethane, a special dissolution method described later is indispensable.

In the case of using the optical film of the present invention for a liquid crystal display device, the optical film is preferably disposed on the outermost surface of the display, for example, by providing an adhesive layer on one surface. Also, the antireflection film of the present invention may be combined with a polarizing plate. In the case where the transparent support is triacetyl cellulose, since triacetyl cellulose is used as a protective film for protecting the polarizing layer of the polarizing plate, the antireflection film of the present invention is preferably used directly as the protective film in view of the cost.

In the case where the optical film of the present invention is disposed on the outermost surface of the display, for example, by providing an adhesive layer on one surface or is used directly as a polarizing plate protective film, the transparent support after the formation of an outermost layer thereon is preferably subjected to a saponification treatment so as to ensure satisfactory adhesion. The saponification treatment is performed by a known method, for example, by dipping the film in an alkali solution for an appropriate time period. After dipping in an alkali solution, the film is preferably well washed with water or dipped in a dilute acid to neutralize the alkali component and allow for no remaining of the alkali component in the film.

By performing a saponification treatment, the surface of the transparent support on the side opposite the surface having the outermost layer is hydrophilized.

The hydrophilized surface is effective particularly for improving the adhesive property to a polarizing film mainly comprising a polyvinyl alcohol. Furthermore, the hydrophilized surface hardly allows for attachment of dust in air and therefore, dust scarcely intrudes into the space between the polarizing film and the antireflection film at the bonding to a polarizing film, so that point defects due to dust can be effectively prevented.

The saponification treatment is preferably performed such that the surface of the transparent support on the side opposite the surface having the outermost layer has a contact angle for water of 40° or less, more preferably 30° or less, still more preferably 20° or less.

The method for the alkali saponification treatment can be specifically selected from the following two methods (1) and (2). The method (1) is advantageous in that the treatment can be performed by the same process as that for the general-purpose triacetyl cellulose film, but since the antireflection film surface is also saponified, there may arise a problem that the film deteriorates resulting from alkali hydrolysis of the surface or the remaining solution for saponification treatment causes staining. In such a case, the method (2) is advantageous, though this is a special process.

(1) After the formation of each coating layer on a transparent support, the support is dipped at least once in an alkali solution, whereby the back surface of the film is saponified.

(2) Before or after the formation of a coating layer on a transparent support, an alkali solution is applied to the surface of the optical film on the side opposite the coated surface, and then the film is heated, washed with water and/or neutralized, whereby only the back surface of the film is saponified.

[Coating System]

The optical film of the present invention can be formed by the following method, but the present invention is not limited to this method. First, a coating solution containing components for forming each layer is prepared. The coating solution prepared for forming various functional layers is coated on a transparent support by a dip coating method, an air knife coating method, a curtain coating method, a roller coating method, a wire bar coating method, a gravure coating method or a die coating method, then heated and dried. Among these coating methods, a microgravure coating method, a wire bar coating method and a die coating method are preferred, and a die coating method is more preferred.

Thereafter, the monomer forming the functional layer is cured through polymerization under light irradiation or heating to form the functional layer. Here, if desired, a plurality of functional layers may be formed.

Next, a coating solution for forming the low refractive index layer is coated on the functional layer in the same manner and then irradiated with light or heated (cured by irradiating ionizing radiation such as ultraviolet ray, preferably irradiating ionizing radiation under heating) to form the low refractive index layer. In this way, the optical film of the present invention is obtained.

The polarizing plate mainly comprises a polarizing film and two protective films sandwiching the polarizing film from both sides. The optical film or antireflection film of the present invention is preferably used for at least one protective film out of two protective films sandwiching the polarizing film from both sides. By arranging the optical film or antireflection film of the present invention to serve also as a protective film, the production cost of the polarizing plate can be reduced. Furthermore, by using the optical film or antireflection film of the present invention as an outermost surface layer, a polarizing plate not allowing for reflection or the like of outside light and being excellent also in the scratch resistance, antifouling property and the like can be obtained.

As for the polarizing film, a known polarizing film or a polarizing film cut out from a lengthy polarizing film with the absorption axis of the polarizing film being neither parallel nor perpendicular to the longitudinal direction, may be used. The lengthy polarizing film with the absorption axis of the polarizing film being neither parallel nor perpendicular to the longitudinal direction is produced by the following method.

This is a polarizing film obtained through stretching by applying a tension to a continuously fed polymer film while holding both edges of the film with holding means and can be produced by a stretching method where the film is stretched to 1.1 to 20.0 times at least in the film width direction, the holding devices at both edges of the film are moved to create a difference in the travelling speed of 3% or less in the longitudinal direction, and the film travelling direction is bent, in the state of the film being held at both edges, such that the angle made by the film travelling direction at the outlet in the step of holding both edges of the film and the substantial stretching direction of the film inclines at 20 to 70°. Particularly, a polarizing film produced with an inclination angle of 45° is preferred in view of productivity.

The stretching method of a polymer film is described in detail in JP-A-2002-86554 (paragraphs [0020] to [0030]).

Out of two protective films of the polarizer, the film other than the antireflection film is preferably an optically compensatory film having an optical compensation layer comprising an optically anisotropic layer. The optically compensatory film (phase difference film) can improve the viewing angle properties of a liquid crystal display screen.

The optically compensatory film may be a known optically compensatory film but from the standpoint of enlarging the viewing angle, an optically compensatory film described in JP-A-2001-100042 where an optical compensation layer comprising a compound having a discotic structure unit is provided and the angle made by the discotic compound and the support is changing in the depth direction of the layer, is preferred.

This angle is preferably increasing as the distance from the support plane side of the optically anisotropic layer increases.

Out of two protective films of the polarizer, the transparent support of at least one protective film preferably satisfies the following formulae (I) and (II), because the effect of improving the display viewed from the oblique direction of a liquid crystal display screen is high. In particular, the transparent support of the present invention preferably satisfies the following formulae (I) and (II).

$$0 \leq Re(630) \leq 10 \text{ and } |Rth(630)| \leq 25 \qquad (I):$$

$$|Re(400) - Re(700)| \leq 10 \text{ and } |Rth(400) - Rth(700)| \leq 35 \qquad (II):$$

The optical film, antireflection film or polarizing plate of the present invention can be applied to an image display device such as liquid crystal display device (LCD), plasma display panel (PDP), electroluminescent display (ELD) and cathode ray tube display device (CRT). Since the optical film, antireflection film or polarizing plate of the present invention has a transparent support, such a film or polarizing plate is preferably used by bonding the transparent support side to the image display surface of the image display device, that is, by arranging the hardcoat layer or low refractive index layer on the viewing side.

In the case of using the optical film or antireflection film of the present invention as one surface protective film of a polarizing film, such a film can be preferably used for a transmissive, reflective or transflective liquid crystal display device in a mode such as twisted nematic (TN) mode, super twisted nematic (STN) mode, vertical alignment (VA) mode, in-plane switching (IPS) mode and optically compensated bend cell (OCB) mode.

The VA-mode liquid crystal cell includes (1) a VA-mode liquid crystal cell in a narrow sense where rod-like liquid crystalline molecules are oriented substantially in the vertical alignment at the time of not applying a voltage and oriented substantially in the horizontal alignment at the time of applying a voltage (described in JP-A-2-176625); (2) a (MVA-mode) liquid crystal cell where the VA mode is modified to a multi-domain system for enlarging the viewing angle (described in SID97, Digest of Tech. Papers (preprints), 28, 845 (1997)); (3) an (n-ASM-mode) liquid crystal cell where rod-like liquid crystalline molecules are oriented substantially in the vertical alignment at the time of not applying a voltage and oriented in the twisted multi-domain alignment at the time of applying a voltage (described in preprints of Japan Liquid Crystal Symposium, 58-59 (1998)); and (4) a SURVAIVAL-mode liquid crystal cell (reported in LCD International 98).

The OCB-mode liquid crystal cell is a liquid crystal display device using a liquid crystal cell of bend alignment mode where rod-like liquid crystalline molecules are aligned substantially in opposite directions (symmetrically) between the upper part and the lower part of the liquid crystal cell, and this is disclosed in U.S. Pat. Nos. 4,583,825 and 5,410,422. Since rod-like liquid crystalline molecules are aligned symmetrically between the upper part and the lower part of the liquid crystal cell, the liquid crystal cell of bend alignment mode has a self-optically compensating ability. Accordingly, this liquid crystal mode is also called an OCB (optically compensatory bend) liquid crystal mode. A liquid crystal display device of bend alignment mode is advantageous in that the response speed is fast.

The entirety including a polarizing plate comprising a bend alignment-mode liquid crystal cell and an optically anisotropic layer preferably has optical properties satisfying the following formula (1') in the measurement at any wavelength of 450 nm, 550 nm and 630 nm, because the effect of improving the display viewed from the oblique direction of a liquid crystal display screen is high. In particular, the polarizing plate using the optical film of the present invention as a protective film preferably satisfies the following formula (1').

$$0.05 < (\Delta n \times d)/(Re \times Rth) < 0.20 \qquad \text{Formula (1'):}$$

[wherein $\Delta n$ is the intrinsic birefringence of the rod-like liquid crystal molecule in the liquid crystal cell, d is the liquid crystal layer thickness (unit: nm) of the liquid crystal cell, Re is the in-plane retardation value of the optically anisotropic layer as a whole, and Rth is the retardation value in the thickness direction of the optically anisotropic layer as a whole].

In the ECB-mode liquid crystal cell, rod-like liquid crystalline molecules are oriented substantially in the horizontal alignment at the time of not applying a voltage. This is most popularly used as a color TFT liquid crystal display device and is described in a large number of publications such as EL, PDP, LCD Display, Toray Research Center (2001).

Particularly, in the case of a TN-mode or IPS-mode liquid crystal display device, as described in JP-A-2001-100043 and the like, an optically compensatory film having an effect of enlarging the viewing angle is preferably used for the protective film on the surface opposite the antireflection film of the present invention out of front and back two protective films of a polarizing film, because a polarizing plate having an antireflection effect and a viewing angle-enlarging effect can be obtained with the thickness of one polarizing plate.

EXAMPLES

The present invention is described in greater detail below by referring to Examples, but the present invention should not be construed as being limited thereto. Unless otherwise indicated, the "parts" and "%" are on the mass basis.

(Preparation of Sol Solution a-1)

In a 1,000 ml-volume reaction vessel equipped with a thermometer, a nitrogen inlet tube and a dropping funnel, 187 g (0.80 mol) of acryloxypropyltrimethoxysilane, 29.0 g (0.21 mol) of methyltrimethoxysilane, 320 g (10 mol) of methanol and 0.06 g (0.001 mol) of KF are charged, and 17.0 g (0.94 mol) of water is gradually added dropwise with stirring at room temperature. After the completion of dropwise addition, the solution is stirred for 3 hours at room temperature and then heated with stirring for 2 hours under reflux of methanol. Thereafter, the low boiling point fraction is removed by distillation under reduced pressure, and the residue is filtered to obtain 120 g of Sol Solution a-1. The thus-obtained substance is measured by GPC, as a result, the mass average molecular weight is 1,500 and out of the oligomer or higher components, the proportion of the components having a molecular weight of 1,000 to 20,000 is 30%.

Also, from the 1H-NMR measurement results, the structure of the obtained substance is the structure represented by the following formula:

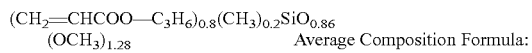

$(CH_2\!=\!CHCOO\!-\!C_3H_6)_{0.8}(CH_3)_{0.2}SiO_{0.86}$
$(OCH_3)_{1.28}$ Average Composition Formula:

Furthermore, the condensation rate α as measured by $^{29}Si$—NMR is 0.59. From these analysis results, the majority of this silane coupling agent sol is found to be a linear structure portion.

Also, it is revealed from the gas chromatography analysis that the residual ratio of the raw material acryloxypropyltrimethoxysilane is 5% or less.

(Synthesis of Perfluoroolefin Copolymer (1))

Perfluoroolefin Copolymer (1):

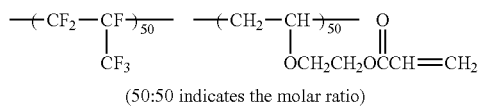

(50:50 indicates the molar ratio)

In a stainless steel-made autoclave having an inner volume of 100 ml and equipped with a stirrer, 40 ml of ethyl acetate, 14.7 g of hydroxyethyl vinyl ether and 0.55 g of dilauroyl peroxide are charged, and the inside of the system is deaerated and displaced with nitrogen gas. Furthermore, 25 g of hexafluoropropylene (HFP) is introduced into the autoclave, and the temperature is elevated to 65° C. The pressure when the temperature in the autoclave reaches 65° C. is 5.4 kg/cm². The reaction is continued for 8 hours while keeping this temperature and when the pressure reaches 3.2 kg/cm², the heating is stopped and the system is allowed to cool. At the time when the inner temperature drops to room temperature, the unreacted monomer is expelled, and the reaction solution is taken out by opening the autoclave. The obtained reaction solution is poured in a large excess of hexane, and the solvent is removed by decantation to take out the precipitated polymer. This polymer is dissolved in a small amount of ethyl acetate, and the residual monomer is completely removed by performing reprecipitation from hexane twice. After drying, 28 g of the polymer is obtained. Subsequently, 20 g of the polymer is dissolved in 100 ml of N,N-dimethylacetamide, and 11.4 g of acrylic acid chloride is added dropwise thereto under ice cooling, followed by stirring at room temperature for 10 hours. Thereafter, ethyl acetate is added to the reaction solution, and the resulting solution is washed with water. The organic layer is extracted and concentrated, and the obtained polymer is reprecipitated from hexane to obtain 19 g of Perfluoroolefin Copolymer (1). The refractive index of the obtained polymer is 1.42.

| (Composition of Coating Solution H-1 for Transparent Hardcoat Layer) | |
|---|---|
| Decafunctional urethane acrylate-based compound (M-1) | 50.0 g |
| Methyl isobutyl ketone | 42.0 g |
| Methyl ethyl ketone | 8.0 g |
| Irgacure 184 (C-18) | 4.0 g |

Compositions of Coating Solutions H-2 to H-10 for Transparent Hardcoat Layer and Coating Solutions HH-1 to HH-3 of Comparative Examples:

The same operation as that for Coating Solution H-1 for Transparent Hardcoat Layer is performed except that the decafunctional urethane acrylate-based compound (M-1) and the photopolymerization initiator (Irgacure 184, C-18) of H-1 are changed as shown in Table 1 below.

TABLE 1

| | Urethane (Meth)acrylate Compound | Other Monomers | Photopolymerization Initiator |
|---|---|---|---|
| H-1 | M-1 (50 g) | none | IRG-184 (C-18), 4 g |
| H-2 | M-2 (50 g) | none | IRG-184 (C-18), 4 g |
| H-3 | M-4 (50 g) | none | IRG-184 (C-18), 4 g |
| H-4 | M-6 (50 g) | none | C-23, 4 g |
| H-5 | M-7 (50 g) | none | C-23, 4 g |
| H-6 | M-1 (30 g) | AA-3 (20 g) | IRG-184 (C-18), 4 g |
| H-7 | M-1 (40 g) | AA-1 (10 g) | IRG-184 (C-18), 4 g |
| H-8 | M-3 (40 g) | none | C-1, 3 g |
| H-9 | M-10 (40 g) | none | C-22, 4 g |
| H-10 | M-5 (40 g) | none | C-29, 3 g |
| HH-1 | AA-1 (50 g) | none | IRG-184 (C-18), 4 g |
| HH-2 | AA-2 (50 g) | none | IRG-184 (C-18), 4 g |
| HH-3 | AA-3 (50 g) | none | IRG-184 (C-18), 4 g |

AA-1:

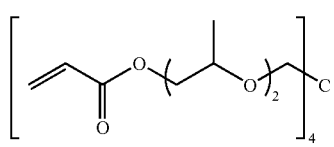

AA-2:

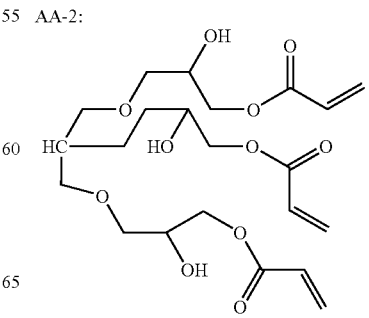

TABLE 1-continued

| Urethane (Meth)acrylate Compound | Other Monomers | Photopolymerization Initiator |
|---|---|---|
| AA-3: (structure shown) | | |

Coating Solutions H-1 to H-10 and HH-1 to HH-5 each is filtered through a polypropylene-made filter having a pore size of 10 μm to prepare a coating solution for transparent hardcoat layer.

(Composition of Coating Solution J-1 for Light-Diffusing Hardcoat Layer)

| Decafunctional urethane acrylate-based compound (M-1) | 50 g |
| Methyl isobutyl ketone | 28.5 g |
| Methyl ethyl ketone | 7.0 g |
| Irgacure 184 (C-18) | 2.0 g |
| SX-500H (30%) | 14.5 g |
| FP-132 | 0.75 g |
| Sol Solution a-1 | 10.0 g |

Compositions of Coating Solutions J-2 to J-10 for Light-Diffusing Hardcoat Layer and Coating Solutions JJ-1 to JJ-4 of Comparative Examples:

The same operation as that for Coating Solution J-1 for Light-Diffusing Hardcoat Layer is performed except that the decafunctional urethane acrylate-based compound (M-1), Irgacure 184 and SX-500H (30%) of J-1 are changed as shown in Table 2 below.

TABLE 2

| | Urethane (Meth)acrylate Compound | Other Monomers | Photopolymerization Initiator | Fine Particle |
|---|---|---|---|---|
| J-1 | M-1 (50 g) | none | IRG-184 (C-18) | SX-500H (30%) |
| J-2 | M-4 (50 g) | none | IRG-184 (C-18) | SX-500H (30%) |
| J-3 | M-6 (50 g) | none | IRG-184 (C-18) | SX-500H (30%) |
| J-4 | M-7 (50 g) | none | IRG-184 (C-18) | SX-500H (30%) |
| J-5 | M-1 (35 g) | AA-1 (15 g) | IRG-184 (C-18) | SX-500H (30%) |
| J-6 | M-7 (35 g) | AA-3 (15 g) | C-23 | SX-500H (30%) |
| J-7 | M-1 (50 g) | none | C-23 | Desolite 7526 (30%) |
| J-8 | M-2 (50 g) | none | IRG-184 (C-18) | Desolite 7404 (30%) |
| J-9 | M-1 (50 g) | none | C-4 | MEK-ST-L (30%) |
| J-10 | M-2 (50 g) | none | C-20 | KBM-5103 (30%) |
| JJ-1 | AA-1 (50 g) | none | IRG-184 (C-18) | SX-500H (30%) |
| JJ-2 | AA-2 (50 g) | none | IRG-184 (C-18) | SX-500H (30%) |
| JJ-3 | AA-3 (50 g) | none | IRG-184 (C-18) | SX-500H (30%) |
| JJ-4 | AA-3 (50 g) | none | IRG-184 (C-18) | MEK-ST-L (30%) |

Coating Solutions J-1 to J-10 and JJ-1 to JJ-4 each is filtered through a polypropylene-made filter having a pore size of 30 μm to prepare a coating solution for light-diffusing hardcoat layer.

(Composition of Coating Solution L-1 for Low Refractive Index Layer)

| JTA-113 | 63.7 g |
| MEK-ST-L | 6.4 g |
| Sol Solution a-1 | 2.9 g |
| Methyl ethyl ketone | 24.5 g |
| Cyclohexanone | 2.9 g |

(Composition of Coating Solution L-2 for Low Refractive Index Layer)

| Perfluoroolefin Copolymer (1) (solid content: 30%) | 13.0 g |
| MEK-ST-L | 6.0 g |
| X-22-164C | 0.15 g |
| Irgacure 907 | 0.23 g |
| Sol Solution a-1 | 0.6 g |
| Methyl ethyl ketone | 77.2 g |
| Cyclohexanone | 2.8 g |

(Composition of Coating Solution L-3 for Low Refractive Index Layer)

| JTA-113 | 73.0 g |
| Hollow silica solution | 19.5 g |
| Sol Solution a-1 | 1.7 g |
| Methyl ethyl ketone | 47.5 g |
| Cyclohexanone | 5.3 g |

Coating Solutions L-1, L-2 and L-3 for Low Refractive Index Layer each is filtered through a polypropylene-made filter having a pore size of 1 μm to prepare a coating solution for low refractive index layer. The refractive index of the layer formed from Coating Solutions L-1 and L-2 is 1.44, and the refractive index of the layer formed from L-3 is 1.39.

The compounds used in H-1 to H-7, HH-1 to HH-3, J-1 to J-10, JJ-1 to JJ-3, and L-1 to L-3 are as follows.

SX-500H (30%):

A crosslinked polystyrene particle having an average particle diameter of 5 μm [refractive index: 1.60, produced by The Soken Chemical & Engineering Co., Ltd., a 30% methyl isobutyl ketone liquid dispersion, used after dispersion by a polytron disperser at 10,000 rpm for 20 minutes].

FP-132:

A fluorine-based surface modifier; a fluororesin-containing polymer represented by the following structural formula, which is described in JP-A-2005-316422, paragraph 0207 (in the formula, "50" indicates mol %).

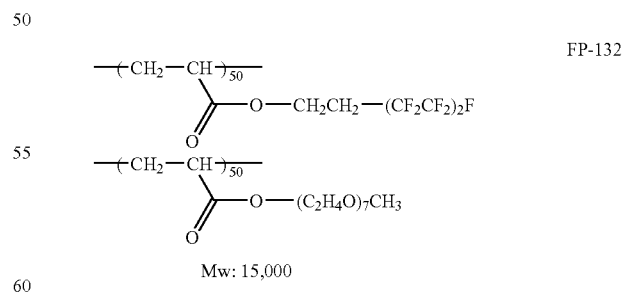

FP-132

Mw: 15,000

SX-350H:

A crosslinked polystyrene particle having an average particle diameter of 3.0 μm [refractive index: 1.60, produced by The Soken Chemical & Engineering Co., Ltd., a 30% methyl isobutyl ketone liquid dispersion, used after dispersion by a polytron disperser at 10,000 rpm for 20 minutes].

Desolite Z7526:
An $SiO_2$ fine particle-containing hardcoat agent [produced by JSR Corp.].
Desolite Z7404:
A $ZrO_2$ fine particle-containing hardcoat agent [refractive index: 1.62, solid content concentration: 60.4%, produced by JSR Corp.].
MEK-ST-L:
A colloidal silica dispersion [a product differing in the particle size from MEK-ST, average particle diameter: 45 nm, solid content concentration: 30%, produced by Nissan Chemicals Industries, Ltd.].
Hollow Silica Solution:
A KBM-5103 (produced by Shin-Etsu Chemical Co., Ltd.) surface-modified hollow silica sol [surface modification ratio: 30 mass % based on silica, CS-60 IPA, refractive index: 1.31, average particle diameter: 60 nm, shell thickness: 10 nm, solid content concentration: 18.2%, produced by Catalysts & Chemicals Ind. Co., Ltd.].
X22-164C:
A reactive silicone [produced by Shin-Etsu Chemical Co., Ltd.].
JTA113:
A thermal crosslinking fluorine-containing polymer containing a polysiloxane and a hydroxyl group and having a refractive index of 1.44 (solid content concentration: 6%, produced by JSR Corp.).

Examples 1 to 15 and Comparative Examples 1 to 5

Production and Evaluation of Optical Film Samples 101 to 120

(1) Coating of Transparent Hardcoat Layer

A 80 μm-thick triacetyl cellulose film (TAC-TD80U, produced by Fujifilm Corp., refractive index: 1.48) in a roll form is unrolled, and the coating solutions for hardcoat layer prepared above each is coated thereon by a die coating method using the above-described slot die under the condition of a conveying speed of 30 m/min to have the construction shown in Table 3, dried at 60° C. for 150 seconds and further irradiated with an ultraviolet ray at an illumination intensity of 400 mW/cm² and an irradiation dose of 250 mJ/cm² by using an air-cooled metal halide lamp of 160 W/cm (manufactured by Eye Graphics Co., Ltd.) under nitrogen purging to form a transparent hardcoat layer. The thickness of the support and the contents of the transparent hardcoat layer are as shown in Table 3.

On the surface where the transparent hardcoat layer is coated, the coating solutions for low refractive index layer prepared above each is coated by a die coating method using the above-described slot die under the condition of a conveying speed of 30 m/min to have the construction shown in Table 3, dried at 120° C. for 75 seconds, further heated for 10 minutes, and then irradiated with an ultraviolet ray at an illumination intensity of 400 mW/cm² and an irradiation dose of 240 mJ/cm² by using an air-cooled metal halide lamp of 240 W/cm (manufactured by Eye Graphics Co., Ltd.) under nitrogen purging to form a low refractive index layer having a thickness of 100 nm, and the obtained film is taken up.

(Production of Optical Film Sample)

Optical film samples are produced by the above-described method according to the combination of layers shown in Table 3 below. The coating layers starting from left in Table 3 are sequentially stacked and coated on the support.

TABLE 3

| Sample No. | | Transparent Hardcoat Layer | | Low Refractive Index Layer | |
|---|---|---|---|---|---|
| | | Coating Solution | Thickness (μm) | Coating Solution | Thickness (μm) |
| Example 1 | 101 Invention | H-1 | 5 | L-1 | 0.09 |
| Example 2 | 102 Invention | H-2 | 5 | L-1 | 0.09 |
| Example 3 | 103 Invention | H-3 | 5 | L-1 | 0.09 |
| Example 4 | 104 Invention | H-4 | 5 | L-1 | 0.09 |
| Example 5 | 105 Invention | H-5 | 5 | L-1 | 0.09 |
| Example 6 | 106 Invention | H-6 | 5 | L-1 | 0.09 |
| Example 7 | 107 Invention | H-7 | 5 | L-1 | 0.09 |
| Example 8 | 108 Invention | H-8 | 5 | L-1 | 0.09 |
| Example 9 | 109 Invention | H-9 | 5 | L-1 | 0.09 |
| Example 10 | 110 Invention | H-10 | 5 | L-1 | 0.09 |
| Example 11 | 111 Invention | H-1 | 5 | L-2 | 0.09 |
| Example 12 | 112 Invention | H-1 | 5 | L-3 | 0.09 |
| Example 13 | 113 Invention | H-3 | 5 | L-2 | 0.09 |
| Example 14 | 114 Invention | H-4 | 5 | L-2 | 0.09 |
| Example 15 | 115 Invention | H-7 | 5 | L-3 | 0.09 |
| Comparative Example 1 | 116 Comparison | HH-1 | 5 | L-1 | 0.09 |
| Comparative Example 2 | 117 Comparison | HH-2 | 5 | L-1 | 0.09 |
| Comparative Example 3 | 118 Comparison | HH-3 | 5 | L-1 | 0.09 |
| Comparative Example 4 | 119 Comparison | HH-3 | 5 | L-2 | 0.09 |
| Comparative Example 5 | 120 Comparison | HH-3 | 5 | L-3 | 0.09 |

(Saponification Treatment of Optical Film)

Samples 101 to 115 after the coating above are subjected to the following treatment. An aqueous 1.5 mol/liter sodium hydroxide solution is prepared and kept at 55° C. Separately, an aqueous 0.01 mol/liter dilute sulfuric acid solution is prepared and kept at 35° C. The produced antireflection film is dipped in the aqueous sodium hydroxide solution for 2 minutes and then dipped in water to thoroughly wash out the aqueous sodium hydroxide solution. Subsequently, the film is dipped in the aqueous dilute sulfuric acid solution for 1 minute and then dipped in water to thoroughly wash out the aqueous dilute sulfuric acid solution. Finally, the sample is thoroughly dried at 120° C.

In this way, saponified optical films (Samples 101 to 115 of Invention) are produced.

(Evaluation of Optical Film)

These obtained optical film samples are evaluated on the following items. The results are shown in Table 4.

(1) Average Reflectance

The back surface of the film is roughened with sand paper and then treated with black ink to eliminate the back surface reflection and in this state, the spectral specular reflectance on the front surface side is measured at an incident angle of 5° in the wavelength region of 380 to 780 nm by using a spectrophotometer (manufactured by JASCO Corp.). The arithmetic mean value of specular reflectances at 450 to 650 nm is used for the result.

(2) Haze

The haze value is measured according to JIS-K7136.

(3) Image Sharpness

The transmitted image sharpness is measured according to JIS K7105 with an optical comb width of 0.5 mm.

(4) Dense Black Appearance

Using a liquid crystal display device where a polarizing plate laminated with the optical film is disposed on the viewing side surface, sensory evaluation of the dense black appearance is performed. The evaluation is performed by the method of arraying a plurality of display units in series and relatively comparing these at the same time. The black tint at the power-off time and the black tint (black screen) at the power-on time each viewed from the frontal side are compared in each film and evaluated according to the following criteria. As the black tint is stronger, the screen is judged to be more distinct.

A: Strong black tint and the screen appears highly distinct.

B: Black but faintly gray-tinted and the screen appears slightly distinct.

C: Black but gray-tinted and the screen appears weakly distinct.

D: Significantly strong gray tint and the screen appears loosened.

(5) Evaluation of Pencil Hardness

As an index for scratch resistance, the evaluation of pensile hardness described in JIS K 5400 is performed. The antireflection film is subjected to moisture conditioning at a temperature of 25° C. and a humidity of 60% RH for 2 hours, and the test is then performed under a load of 1 kg by using a 3H pencil for test prescribed in JIS S 6006.

A: Scratches are not observed at all in the evaluation of n=5.

B: One or two scratches are observed in the evaluation of n=5.

C: Three or more scratches are observed in the evaluation of n=5.

C: from 10 to less than 20 mm

D: from 20 to less than 40 mm

E: 40 mm or more (7) Brittleness

One end (A) in the longitudinal direction of the sample of 35 mm×250 mm is fixed near a slit of a plate jig having a 7 mm-width slit, another end (B) is passed through the slit to appear on the other side, the sample come out to the other side is made to form a hairpin-shaped loop, and the leading end (B) is pulled out to this side from the other side through the slit. The surface where the hardcoat layer is coated is arranged outside. The presence or absence of cracking in the sample pulled out is confirmed, and the distance between the end on the fixed side (A) and the portion from which the cracking starts is measured and evaluated according to the following criteria. A smaller distance indicates a smaller curvature radius at the generation of cracking and more difficulty of cracking.

A: less than 20 mm

B: from 20 to less than 30 mm

C: from 30 to less than 50 mm

D: from 50 to less than 80 mm

E: 80 mm or more

TABLE 4

| | Sample No. | Average Reflectance, % | Haze, % | Image Sharpness, % | Dense Black Appearance | Pencil Hardness | Curling | Brittleness |
|---|---|---|---|---|---|---|---|---|
| Example 1 | 101 Invention | 3.4 | 0.8 | 49 | B | A | B | B |
| Example 2 | 102 Invention | 3.3 | 0.9 | 53 | B | B | B | B |
| Example 3 | 103 Invention | 3.4 | 0.8 | 50 | B | B | B | B |
| Example 4 | 104 Invention | 2.7 | 0.9 | 52 | B | A | B | B |
| Example 5 | 105 Invention | 2.4 | 0.8 | 46 | B | B | B | B |
| Example 6 | 106 Invention | 3.4 | 0.8 | 51 | B | B | B | B |
| Example 7 | 107 Invention | 3.3 | 0.7 | 49 | B | B | B | B |
| Example 8 | 108 Invention | 3.4 | 0.9 | 53 | B | B | A | B |
| Example 9 | 109 Invention | 3.5 | 0.7 | 50 | B | A | B | B |
| Example 10 | 110 Invention | 2.4 | 0.8 | 53 | B | B | B | B |
| Example 11 | 111 Invention | 2.7 | 0.8 | 51 | B | B | A | A |
| Example 12 | 112 Invention | 2.4 | 0.7 | 49 | B | B | B | A |
| Example 13 | 113 Invention | 3.4 | 0.9 | 55 | B | B | B | B |
| Example 14 | 114 Invention | 3.3 | 0.8 | 49 | B | B | B | B |
| Example 15 | 115 Invention | 3.4 | 0.7 | 48 | B | B | A | B |
| Comparative Example 1 | 116 Comparison | 3.5 | 0.7 | 49 | B | B | E | E |
| Comparative Example 2 | 117 Comparison | 3.4 | 1.5 | 53 | B | C | B | A |
| Comparative Example 3 | 118 Comparison | 2.7 | 1.8 | 51 | B | B | E | E |
| Comparative Example 4 | 119 Comparison | 2.4 | 0.8 | 49 | B | B | E | E |
| Comparative Example 5 | 120 Comparison | 3.2 | 0.7 | 52 | C | A | E | E |

(6) Curling

The optical film sample is cut into a size of 20 cm×20 cm and placed on a horizontal desk in an environment of 25° C. and 60% RH by facing up the surface where the film is lifting at four corners. After the passing of 24 hours, the distance by which the film lifts from the desk surface at four corners is measured by means of a ruler, and the average of four corners is determined. The average value is classified and evaluated according to the following criteria.

A: less than 5 mm

B: from 5 to less than 10 mm

The results in Table 4 reveal the followings.

In Examples of the present invention, the optical performance of the optical film in terms of antireflection (average reflectance, haze, image sharpness, dense black appearance) is in the desired range, the hardness of the coated film is high, the scratch resistance against pencil and the like is excellent, the curling is small, and the brittleness is greatly improved.

Such an optical film excellent in the overall performance of the optical film can be for the first time obtained by the present invention.

Examples 16 to 30 and Comparative Examples 6 to 10

Production and Evaluation of Optical Film Samples 201 to 215

(1) Coating of Light-Diffusing Hardcoat Layer

A 80 μm-thick triacetyl cellulose film (TAC-TD80U, produced by Fujifilm Corp., refractive index: 1.48) in a roll form is unrolled, and the coating solutions for light-diffusing hardcoat layer prepared above each is coated thereon by a die coating method using the above-described slot die under the condition of a conveying speed of 30 m/min to have the construction shown in Table 5 below, dried at 60° C. for 150 seconds and further irradiated with an ultraviolet ray at an illumination intensity of 400 mW/cm² and an irradiation dose of 250 mJ/cm² by using an air-cooled metal halide lamp of 160 W/cm (manufactured by Eye Graphics Co., Ltd.) under nitrogen purging to form a light-diffusing hardcoat layer. The contents of the hardcoat layer are as shown in Table 5. The thickness is adjusted by the coated amount.

(2) Coating of Low Refractive Index Layer

On the surface where the light-diffusing hardcoat layer is coated, the coating solutions for low refractive index layer prepared above each is coated by a die coating method using the above-described slot die under the condition of a conveying speed of 30 m/min to have the construction shown in Table 5, dried at 120° C. for 75 seconds, further heated for 10 minutes, and then irradiated with an ultraviolet ray at an illumination intensity of 400 mW/cm² and an irradiation dose of 240 mJ/cm² by using an air-cooled metal halide lamp of 240 W/cm (manufactured by Eye Graphics Co., Ltd.) under nitrogen purging to form a low refractive index layer having a thickness of 100 nm, and the obtained film is taken up.

(Production of Optical Film Sample)

Optical film samples are produced by the above-described method according to the combination of layers shown in Table 5 below. The coating layers starting from left in Table 5 are sequentially stacked and coated on the support.

TABLE 5

| | Sample No. | Light-Diffusing Hardcoat Layer | | Low Refractive Index Layer | |
|---|---|---|---|---|---|
| | | Coating Solution | Thickness (μm) | Coating Solution | Thickness (μm) |
| Example 16 | 201 Invention | J-1 | 6 | L-1 | 0.09 |
| Example 17 | 202 Invention | J-2 | 6 | L-1 | 0.09 |
| Example 18 | 203 Invention | J-3 | 6 | L-1 | 0.09 |
| Example 19 | 204 Invention | J-4 | 6 | L-I | 0.09 |
| Example 20 | 205 Invention | J-5 | 6 | L-1 | 0.09 |
| Example 21 | 206 Invention | J-6 | 6 | L-1 | 0.09 |
| Example 22 | 207 Invention | J-7 | 6 | L-1 | 0.09 |
| Example 23 | 208 Invention | J-8 | 6 | L-1 | 0.09 |
| Example 24 | 209 Invention | J-9 | 6 | L-1 | 0.09 |
| Example 25 | 210 Invention | J-10 | 6 | L-1 | 0.09 |
| Example 26 | 211 Invention | J-1 | 6 | L-2 | 0.09 |
| Example 27 | 212 Invention | J-1 | 6 | L-3 | 0.09 |
| Example 28 | 213 Invention | J-3 | 6 | L-2 | 0.09 |
| Example 29 | 214 Invention | J-4 | 6 | L-2 | 0.09 |
| Example 30 | 215 Invention | J-7 | 6 | L-3 | 0.09 |
| Comparative Example 6 | 216 Comparison | JJ-1 | 6 | L-1 | 0.09 |
| Comparative Example 7 | 217 Comparison | JJ-2 | 6 | L-1 | 0.09 |
| Comparative Example 8 | 218 Comparison | JJ-3 | 6 | L-1 | 0.09 |
| Comparative Example 9 | 219 Comparison | JJ-4 | 13 | L-1 | 0.09 |
| Comparative Example 10 | 220 Comparison | JJ-1 | 13 | L-2 | 0.09 |

(Saponification Treatment of Optical Film)

The samples after the coating above are subjected to the following treatment. An aqueous 1.5 mol/liter sodium hydroxide solution is prepared and kept at 55° C. Separately, an aqueous 0.01 mol/liter dilute sulfuric acid solution is prepared and kept at 35° C. The produced antireflection film is dipped in the aqueous sodium hydroxide solution for 2 minutes and then dipped in water to thoroughly wash out the aqueous sodium hydroxide solution. Subsequently, the film is dipped in the aqueous dilute sulfuric acid solution for 1 minute and then dipped in water to thoroughly wash out the aqueous dilute sulfuric acid solution. Finally, the sample is thoroughly dried at 120° C.

In this way, saponified optical films (Samples 201 to 215 of the Invention) are produced.

(Evaluation of Optical Film)

These obtained optical film samples are subjected to the same evaluations as in Example 1 and further evaluated also on the antiglare property. The results are shown in Table 6.

(8) Antiglare Property

The entire back side of the coated surface of the obtained film is perfectly painted with a black marker ink, and the degree of blurring of the reflected image is evaluated according to the following criteria when a bare fluorescent lamp (8,000 cd/m²) without louver is projected from an angle of 5° and the reflected image is observed from the direction of −5° and when projected from an angle of 45° and observed from the direction of −45°.

A: The contour of the fluorescent lamp is slightly observed at both −5° and −45°.

B: The contour of the fluorescent lamp is slightly observed at −5°, but a relatively clear contour is observed at −45°.

C: A relatively clear contour of the fluorescent lamp is observed at both −5° and −45°.

D: The contour of the fluorescent lamp is clearly observed or glares at both −5° and −45°.

TABLE 6

| | Sample No. | Average Reflectance, % | Haze, % | Image Sharpness, % | Dense Black Appearance | Antiglare Property | Pencil Hardness | Curling | Brittleness |
|---|---|---|---|---|---|---|---|---|---|
| Example 16 | 201 Invention | 3.4 | 29 | 49 | B | B | A | B | B |
| Example 17 | 202 Invention | 3.4 | 28 | 51 | B | B | A | B | B |
| Example 18 | 203 Invention | 3.5 | 30 | 49 | B | B | B | B | B |
| Example 19 | 204 Invention | 3.3 | 32 | 47 | B | B | B | B | B |
| Example 20 | 205 Invention | 3.5 | 31 | 48 | B | B | B | B | B |
| Example 21 | 206 Invention | 3.4 | 30 | 52 | B | B | A | B | B |
| Example 22 | 207 Invention | 3.4 | 29 | 50 | B | B | B | B | B |
| Example 23 | 208 Invention | 3.3 | 30 | 51 | B | B | A | B | B |
| Example 24 | 209 Invention | 2.4 | 24 | 49 | B | B | A | B | B |
| Example 25 | 210 Invention | 2.3 | 29 | 47 | B | B | B | B | B |
| Example 26 | 211 Invention | 2.7 | 28 | 52 | A | B | B | A | A |
| Example 27 | 212 Invention | 2.4 | 27 | 46 | A | A | B | B | A |
| Example 28 | 213 Invention | 3.3 | 30 | 52 | A | A | B | B | B |
| Example 29 | 214 Invention | 3.3 | 28 | 48 | B | B | B | B | B |
| Example 30 | 215 Invention | 3.4 | 29 | 51 | B | B | B | A | B |
| Comparative Example 6 | 216 Comparison | 2.4 | 30 | 55 | B | B | B | E | D |
| Comparative Example 7 | 217 Comparison | 3.4 | 28 | 48 | B | D | D | B | B |
| Comparative Example 8 | 218 Comparison | 2.7 | 32 | 47 | A | B | B | E | D |
| Comparative Example 9 | 219 Comparison | 2.4 | 24 | 49 | B | B | A | E | C |
| Comparative Example 10 | 220 Comparison | 3.2 | 29 | 51 | C | B | A | E | D |

The results in Table 6 reveal the followings.

In Examples of the present invention, the optical performance of the optical film in terms of antireflection (average reflectance, haze, image sharpness, dense black appearance, antiglare property) is in the desired range, the hardness of the coated film is high, the scratch resistance against pencil and the like is excellent, the curling is small, and the brittleness is greatly improved.

Such an optical film excellent in the overall performance of the optical film can be for the first time obtained by the present invention.

Examples 31 and 32

Preparation of Coating Solution for Hardcoat Layer

The following composition is charged into a mixing tank and stirred to prepare a coating solution for hardcoat layer.

73.0 Parts by mass of methyl ethyl ketone, 50.0 parts by mass of cyclohexanone and 5.0 parts by mass of a photopolymerization initiator (Irgacure 184, produced by Nippon Ciba Geigy) are added to 100.0 parts by mass of Hardcoat Urethane Acrylate UN-904 (produced by Negami Chemical Industrial Co., Ltd.) (Example 31), or to 100.0 parts by mass of urethane acrylate, ARONIX M-1960 (produced by Toagosei Co., Ltd.) (Example 32), and the mixture is stirred. The obtained solution is filtered through a polypropylene-made filter having a pore size of 0.4 μl to prepare a coating solution for hardcoat layer.

(Preparation of Titanium Dioxide Fine Particle Liquid Dispersion)

As for the titanium dioxide fine particle, a titanium dioxide fine particle (MPT-129C, produced by Ishihara Sangyo Kaisha, Ltd., $TiO_2:CO_3O_4:Al_2O_3:ZrO_2=90.5:3.0:4.0:0.5$ by mass) containing cobalt and being surface-treated with aluminum hydroxide and zirconium hydroxide is used.

41.1 Parts by mass of the dispersant shown below and 701.8 parts by mass of cyclohexanone are added to 275.1 parts by mass of the particle above, and the particle is dispersed by a Dyno mill to prepare a titanium dioxide liquid dispersion having a mass average diameter of 70 nm.

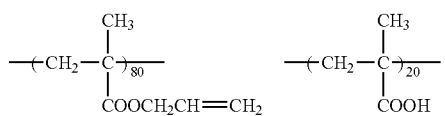

(Preparation of Coating Solution for Medium Refractive Index Layer)

68.0 Parts by mass of a mixture (DPHA) of dipentaerythritol pentaacrylate and dipentaerythritol hexaacrylate, 3.6 parts by mass of a photopolymerization initiator (Irgacure 907), 1.2 parts by mass of a photosensitizer (KAYACURE DETX, produced by Nippon Kayaku Co., Ltd.), 279.6 parts by mass of methyl ethyl ketone and 1049.0 parts by mass of cyclohexanone are added to 99.1 parts by mass of the titanium dioxide liquid dispersion prepared above, and stirred. After thorough stirring, the obtained solution is filtered through a polypropylene-made filter having a pore size of 0.4 μm to prepare Coating Solution A for Medium Refractive Index Layer.

(Preparation of Coating Solution for High Refractive Index Layer)

40.0 Parts by mass of a mixture of dipentaerythritol pentaacrylate and dipentaerythritol hexaacrylate (DPHA, produced by Nippon Kayaku Co., Ltd.), 3.3 parts by mass of a photopolymerization initiator (Irgacure 907, produced by Nippon Ciba Geigy), 1.1 parts by mass of a photosensitizer (KAYACURE DETX, produced by Nippon Kayaku Co., Ltd.), 526.2 parts by mass of methyl ethyl ketone and 459.6 parts by mass of cyclohexanone are added to 469.8 parts by mass of the titanium dioxide liquid dispersion prepared above, and stirred. The obtained solution is filtered through a polypropylene-made filter having a pore size of 0.4 μm to prepare a coating solution for high refractive index layer.

(Preparation of Coating Solution for Low Refractive Index Layer)

The copolymer shown below according to the present invention is dissolved in methyl isobutyl ketone to a concentration of 7 mass %, and a terminal methacrylate group-containing resin, X-22-164C (produced Shin-Etsu Chemical Co., Ltd.), in a ratio of 3% based on the solid content and a photoradical generator, Irgacure 907 (trade name), in a ratio of 5 mass % based on the solid content are added thereto to prepare a coating solution for low refractive index layer.

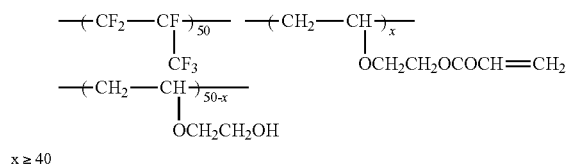

x ≥ 40

(Production of Antireflection Film)

The coating solution for hardcoat layer is coated on a 80 μm-thick triacetyl cellulose film (TD-80UF, produced by Fujifilm Corp.) by a gravure coater and dried at 100° C., and the coated layer is then cured by irradiating an ultraviolet ray at an illumination intensity of 400 mW/cm$^2$ and an irradiation dose of 300 mJ/cm$^2$ with use of an air-cooled metal halide lamp of 160 W/cm (manufactured by Eye Graphics Co., Ltd.) while purging the system with nitrogen to create an atmosphere having an oxygen concentration of 1.0 vol % or less, whereby a hardcoat layer having a thickness of 8 μm is formed.

On the hardcoat layer, the coating solution for medium refractive index layer, the coating solution for high refractive index layer and the coating for low refractive index layer are continuously coated by using a gravure coater having three coating stations.

In the coating of the medium refractive index layer, the drying conditions are 90° C. and 30 seconds and the ultraviolet curing is performed using an air-cooled metal halide lamp of 180 W/cm (manufactured by Eye Graphics Co., Ltd.) at an illumination intensity of 400 mW/cm$^2$ and an irradiation dose of 400 mJ/cm$^2$ while purging the system with nitrogen to create an atmosphere having an oxygen concentration of 1.0 vol % or less.

The medium refractive index layer after curing has a refractive index of 1.630 and a thickness of 67 nm.

In the coating of the high refractive index layer, the drying conditions are 90° C. and 30 seconds and the ultraviolet curing is performed using an air-cooled metal halide lamp of 240 W/cm (manufactured by Eye Graphics Co., Ltd.) at an illumination intensity of 600 mW/cm$^2$ and an irradiation dose of 400 mJ/cm$^2$ while purging the system with nitrogen to create an atmosphere having an oxygen concentration of 1.0 vol % or less.

The high refractive index layer after curing has a refractive index of 1.905 and a thickness of 107 nm.

In the coating of the low refractive index layer, the drying conditions are 90° C. and 30 seconds and the ultraviolet curing is performed using an air-cooled metal halide lamp of 240 W/cm (manufactured by Eye Graphics Co., Ltd.) at an illumination intensity of 600 mW/cm$^2$ and an irradiation dose of 600 mJ/cm$^2$ while purging the system with nitrogen to create an atmosphere having an oxygen concentration of 0.1 vol % or less.

The low refractive index layer after curing has a refractive index of 1.440 and a thickness of 85 nm. In this way, an antireflection film is produced.

(Saponification Treatment of Optical Film)

Samples after the coating above are subjected to the following treatment. An aqueous 1.5 mol/liter sodium hydroxide solution is prepared and kept at 55° C. Separately, an aqueous 0.01 mol/liter dilute sulfuric acid solution is prepared and kept at 35° C. The produced antireflection film is dipped in the aqueous sodium hydroxide solution for 2 minutes and then dipped in water to thoroughly wash out the aqueous sodium hydroxide solution. Subsequently, the film is dipped in the aqueous dilute sulfuric acid solution for 1 minute and then dipped in water to thoroughly wash out the aqueous dilute sulfuric acid solution. Finally, the sample is thoroughly dried at 120° C.

In this way, a saponified optical film is produced.

(Evaluation of Optical Film)

These obtained optical film samples are subjected to the same evaluations as in Example 1, as a result, it is revealed that the optical film of the present invention is excellent in the optical performance in terms of antireflection (average reflectance, haze, image sharpness, dense black appearance, antiglare property), the hardness of the coated film is high, the scratch resistance against pencil and the like is excellent, the curling is small, and the brittleness is greatly improved.

Example 33

A 80 μm-thick triacetyl cellulose film (TAC-TD80U, produced by Fujifilm Corp.) which is dipped in an aqueous 1.5 mol/liter NaOH solution at 55° C. for 2 minutes, neutralized and then washed with water, and each film of the (saponified) samples of the present invention produced in Examples 1 and 16 are bonded for protection to both surfaces of a polarizing film produced by adsorbing iodine to polyvinyl alcohol and stretching the film, whereby a polarizing plate is produced. The thus-produced polarizing plate is laminated to replace the polarizing plate on the viewing side of a liquid crystal display device (where D-BEF produced by Sumitomo 3M Ltd., which is a polarizing separation film with a polarization selective layer, is provided between the backlight and the liquid crystal cell) of a note-type personal computer having mounted thereon a transmissive TN liquid crystal display device, such that the antireflection film side works out to the outermost surface. As a result, a display device with extremely reduced projection of surrounding scene and very high display quality is obtained.

Example 34

In a transmissive TN liquid crystal cell laminated with each film of the samples of the present invention produced in Examples 1 and 16, an optically compensatory film (Wide View Film Ace, produced by Fujifilm Corp.) is used for the protective film on the liquid crystal cell side of the polarizing plate on the viewing side as well as for the protective film on the liquid crystal cell side of the polarizing plate on the backlight side, as a result, a liquid crystal display device assured of excellent contrast in bright room, a very wide viewing angle in the up/down and light/left directions, remarkably excellent visibility and high display quality is obtained.

Also, the samples of the present invention have a light-scattering intensity at 30° of 0.06% based on an outgoing angle of 0° and by virtue of this light-diffusing property, the liquid crystal display device is a very good liquid crystal display particularly with enlarged viewing angle in the down direction and improved yellow tinting in the right/left directions.

Example 35

Each film of the samples of the present invention produced in Example 1 is laminated to a glass plate on the surface of an organic EL display device through a pressure-sensitive adhesive, as a result, a display device reduced in the reflection on the glass surface and assured of high visibility is obtained.

Example 36

A polarizing plate having an optical film on one surface is produced by using each film of the samples of the present invention produced in Examples 1 and 16, a λ/4 plate is laminated on the polarizing plate surface opposite the side having the optically functional film, and the resulting polarizing plate is laminated to a glass plate on the surface of an organic EL display device by disposing the low refractive index layer side to work out to the outermost surface, as a result, surface reflection and reflection from the inside of the surface glass are cut and a display with remarkably high visibility is obtained.

The optical film of the present invention is assured of small curling despite strong film strength and excellent in the required optical performance. Furthermore, the display device equipped with the optical film or antireflection film of the present invention and the display device equipped with a polarizing plate using the optical film or antireflection film of the present invention are reduced in the reflection of outside light or surrounding scene and exhibits high display quality with very high visibility and less display unevenness.

The entire disclosure of each and every foreign patent application from which the benefit of foreign priority has been claimed in the present application is incorporated herein by reference, as if fully set forth.

What is claimed is:

1. An optical film comprising:
   a transparent support; and
   a hardcoat layer that is a layer formed by curing a coating solution, the coating solution comprising (A) an octa- to pentadeca-functional urethane (meth)acrylate-based compound having a molecular weight of 800 to 1,363 and having two or more urethane bonds in its molecule; and a photopolymerization initiator.

2. The optical film according to claim 1, wherein the compound (A) is a compound synthesized by reacting an additive compound of an isocyanate compound and an active hydrogen-containing compound, with a compound having a (meth)acryloyl group and a reactive group.

3. The optical film according to claim 2, wherein the active hydrogen-containing compound is a polyol.

4. The optical film according to claim 1, wherein the hardcoat layer is a light-diffusing hardcoat layer comprising a light-transparent particle or a transparent hardcoat layer not comprising a light-transparent particle.

5. The optical film according to claim 1, wherein the hardcoat layer comprises the compound (A); and a trifunctional or greater polyfunctional (meth)acrylate compound.

6. An antireflection film comprising:
   the optical film according to claim 1; and
   a layer, on the hardcoat layer of the optical film, having a refractive index lower than that of the hardcoat layer.

7. A polarizing plate comprising:
   a pair of protective films; and
   a polarizing film sandwiched between the pair of protective films,
   wherein
   at least one of the protective films is the optical film according to claim 1.

8. A display device comprising:
   the optical film according to claim 1,
   wherein
   the hardcoat layer of the optical film is disposed on a viewing side.

* * * * *